Oct. 1, 1957 J. N. WOGNUM ET AL 2,807,997
BOX STRAPPING MACHINE
Filed March 12, 1952 23 Sheets-Sheet 1
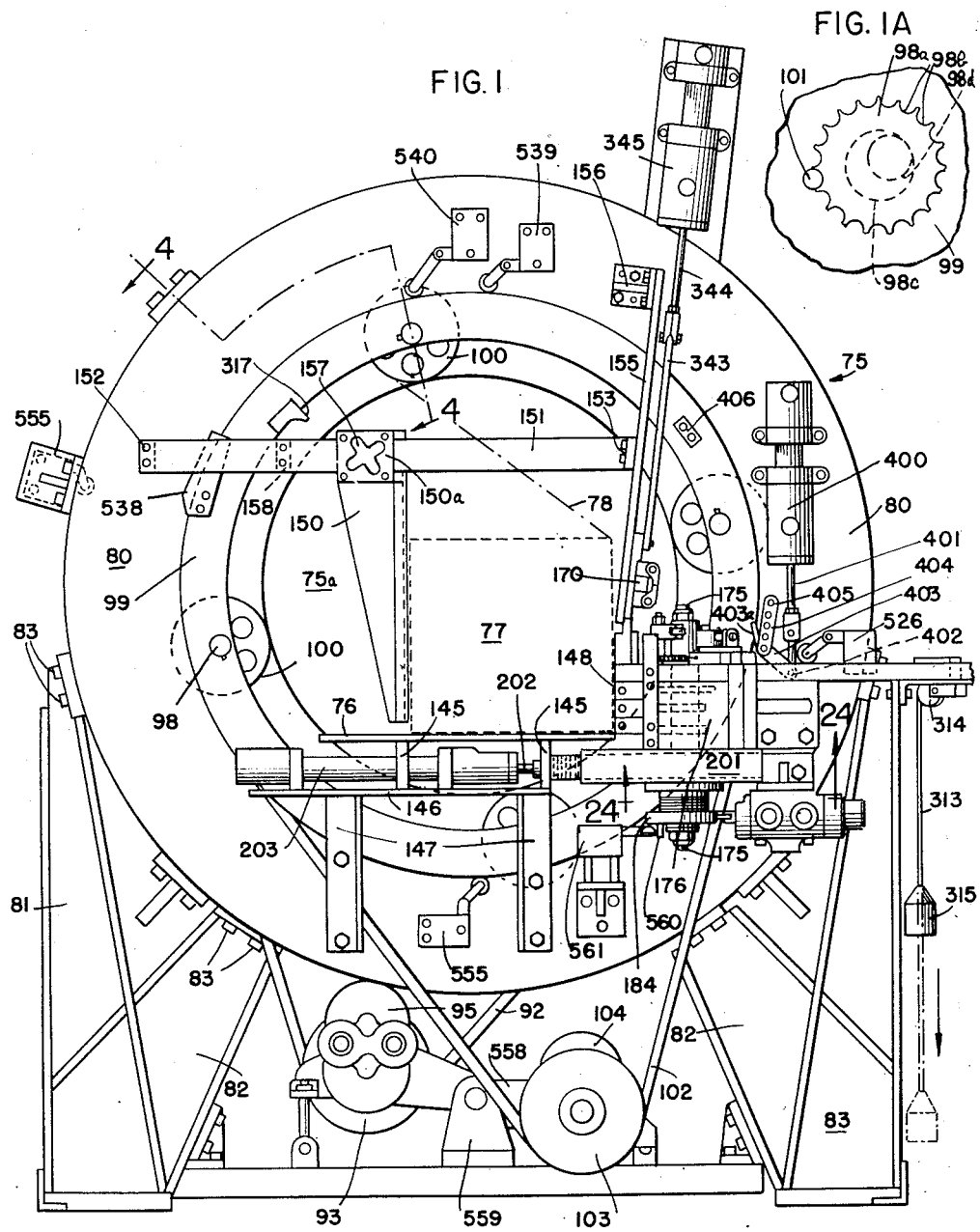
INVENTORS:
JAMES N. WOGNUM
THOMAS J. FULLERTON
WILLIAM B. AHERN
BY
*Smith, Olsen & Baird,*
ATT'YS

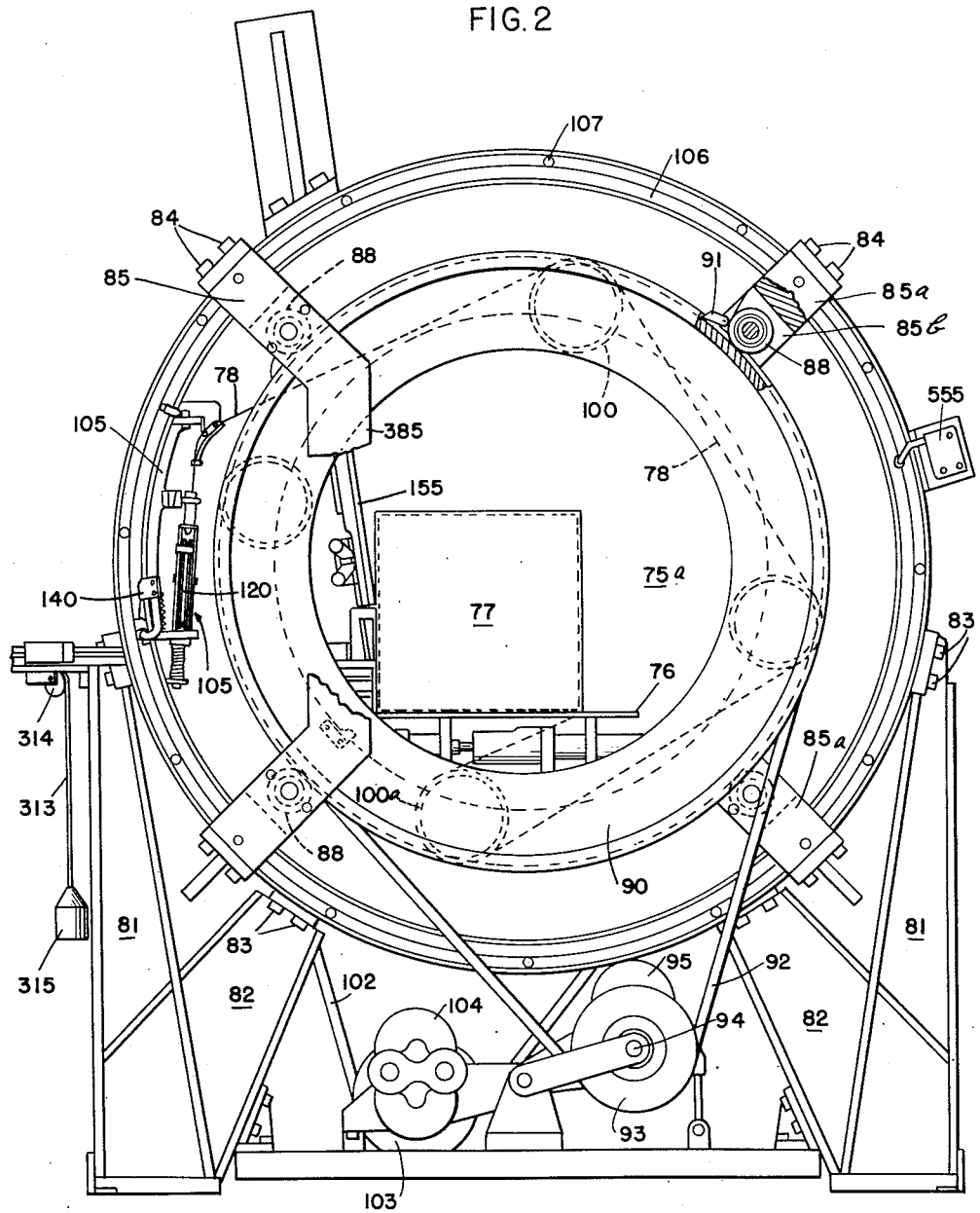

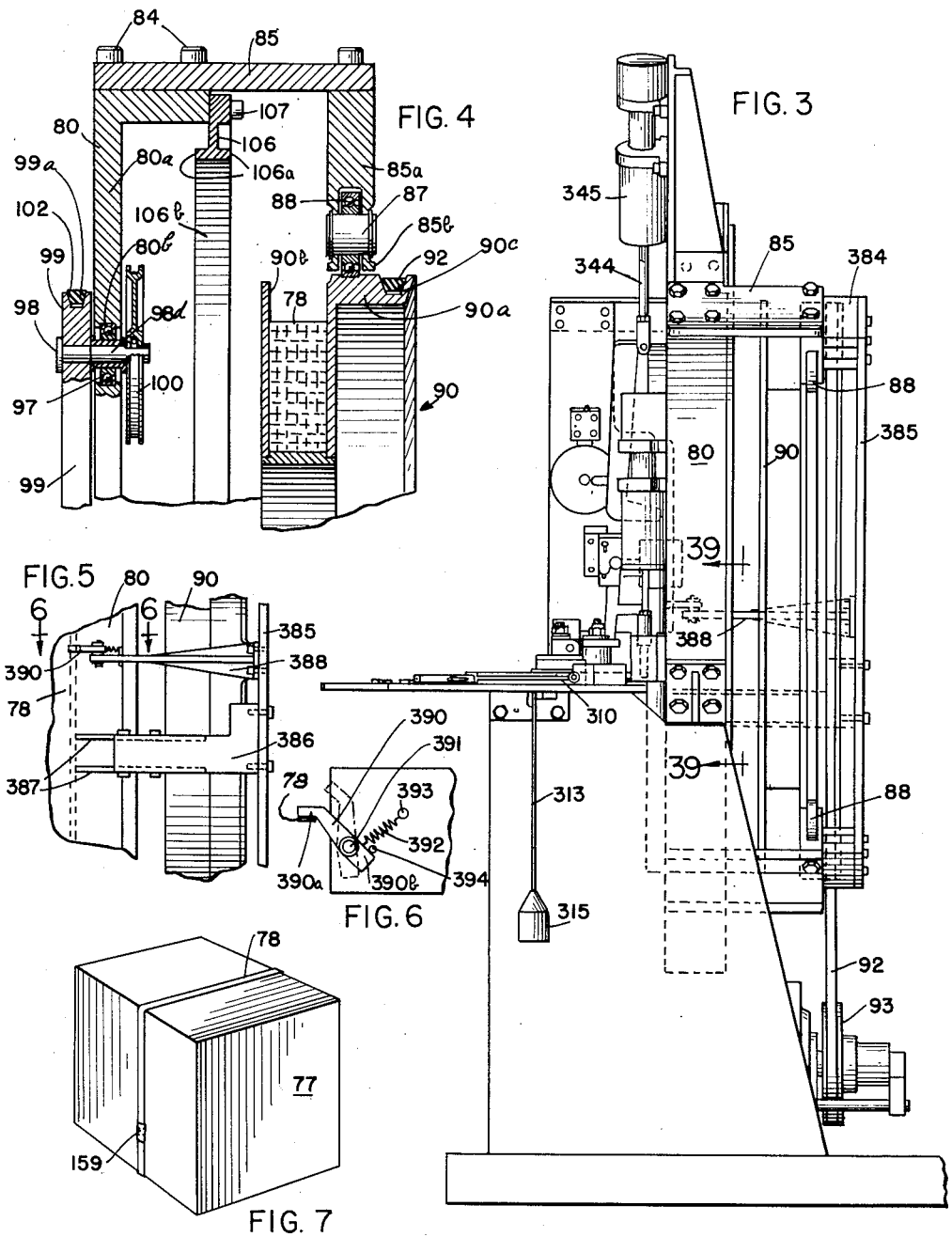

Oct. 1, 1957
J. N. WOGNUM ET AL
2,807,997
BOX STRAPPING MACHINE
Filed March 12, 1952
23 Sheets-Sheet 4
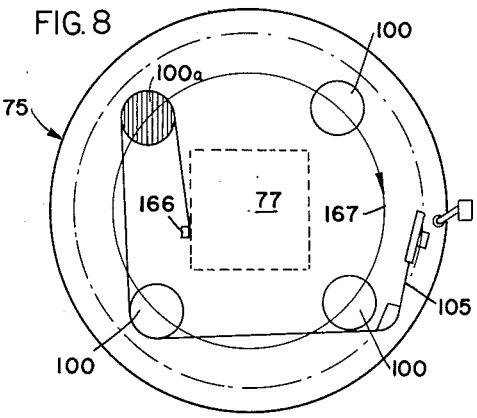
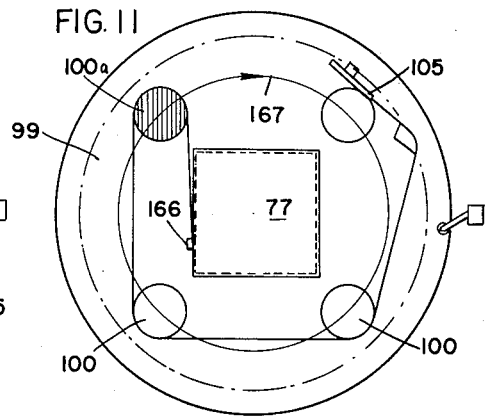
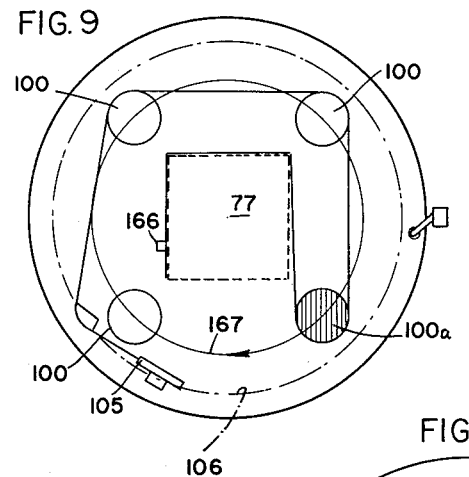
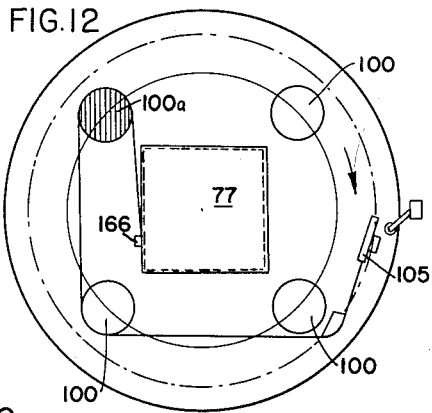
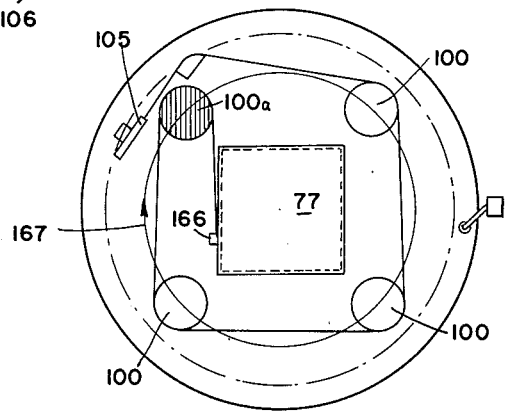
INVENTORS:
JAMES N. WOGNUM
THOMAS J. FULLERTON
BY   WILLIAM B. AHERN
ATT'YS Oct. 1, 1957    J. N. WOGNUM ET AL    2,807,997
BOX STRAPPING MACHINE
Filed March 12, 1952    23 Sheets-Sheet 6

INVENTORS:
JAMES N. WOGNUM
THOMAS J. FULLERTON
WILLIAM B. AHERN
BY
ATT'YS

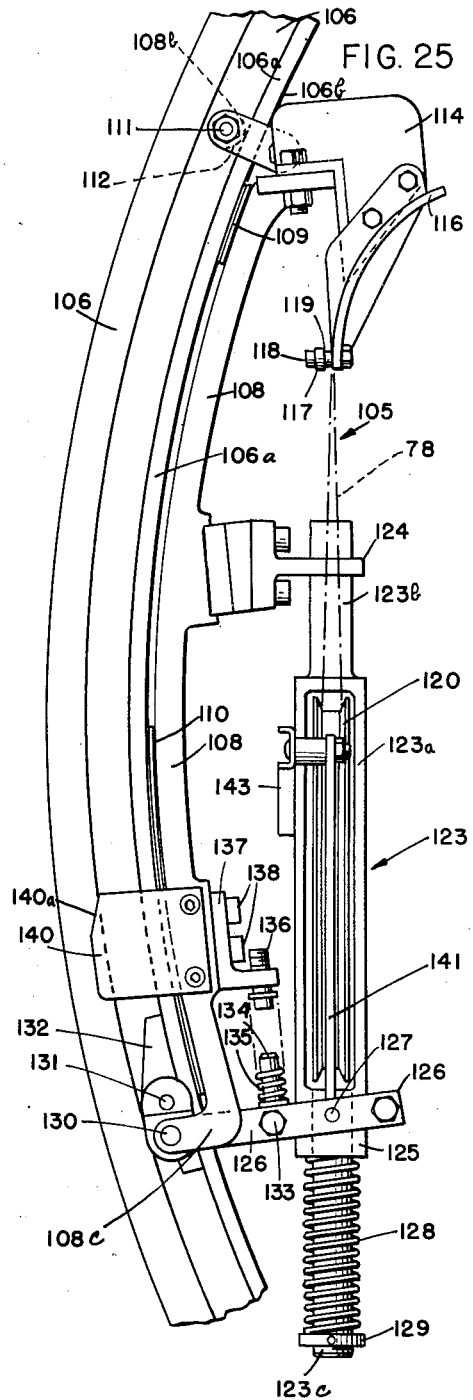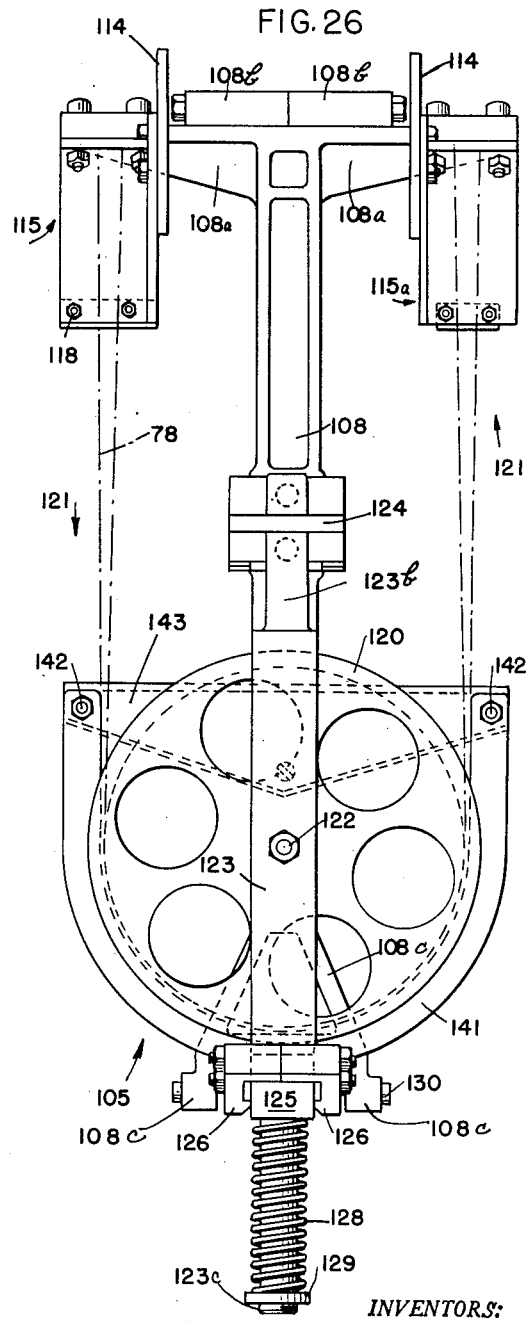

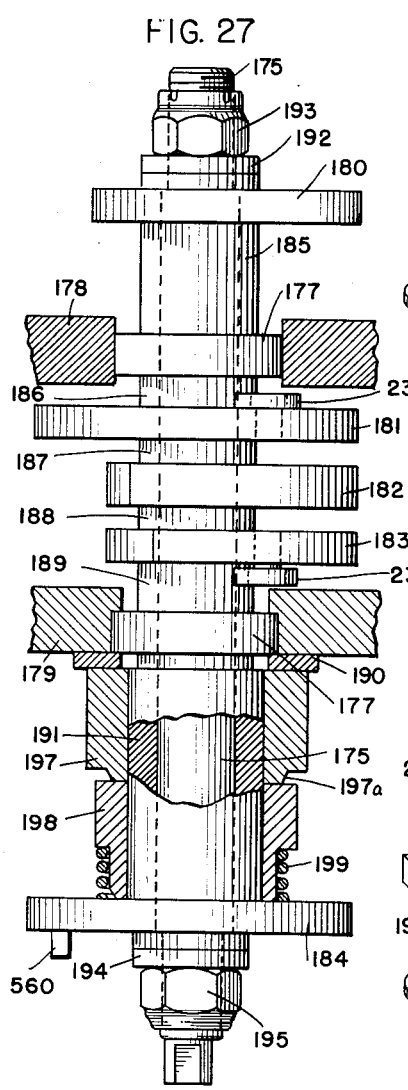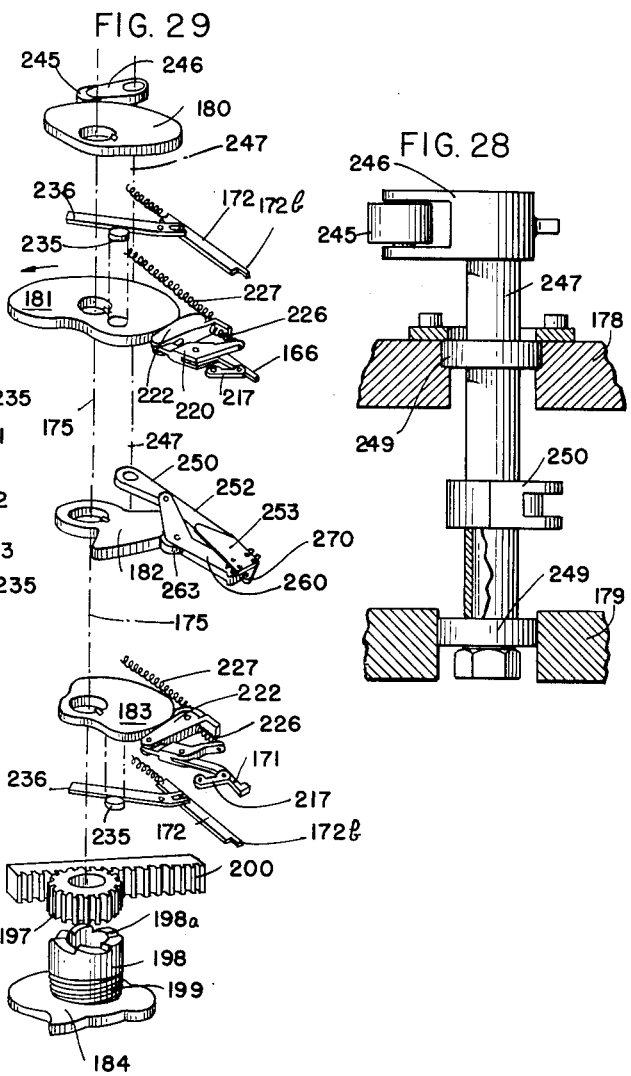

Oct. 1, 1957  J. N. WOGNUM ET AL  2,807,997
BOX STRAPPING MACHINE
Filed March 12, 1952  23 Sheets-Sheet 9

INVENTORS:
JAMES N. WOGNUM
THOMAS J. FULLERTON
WILLIAM B. AHERN
BY
ATT'Y.S

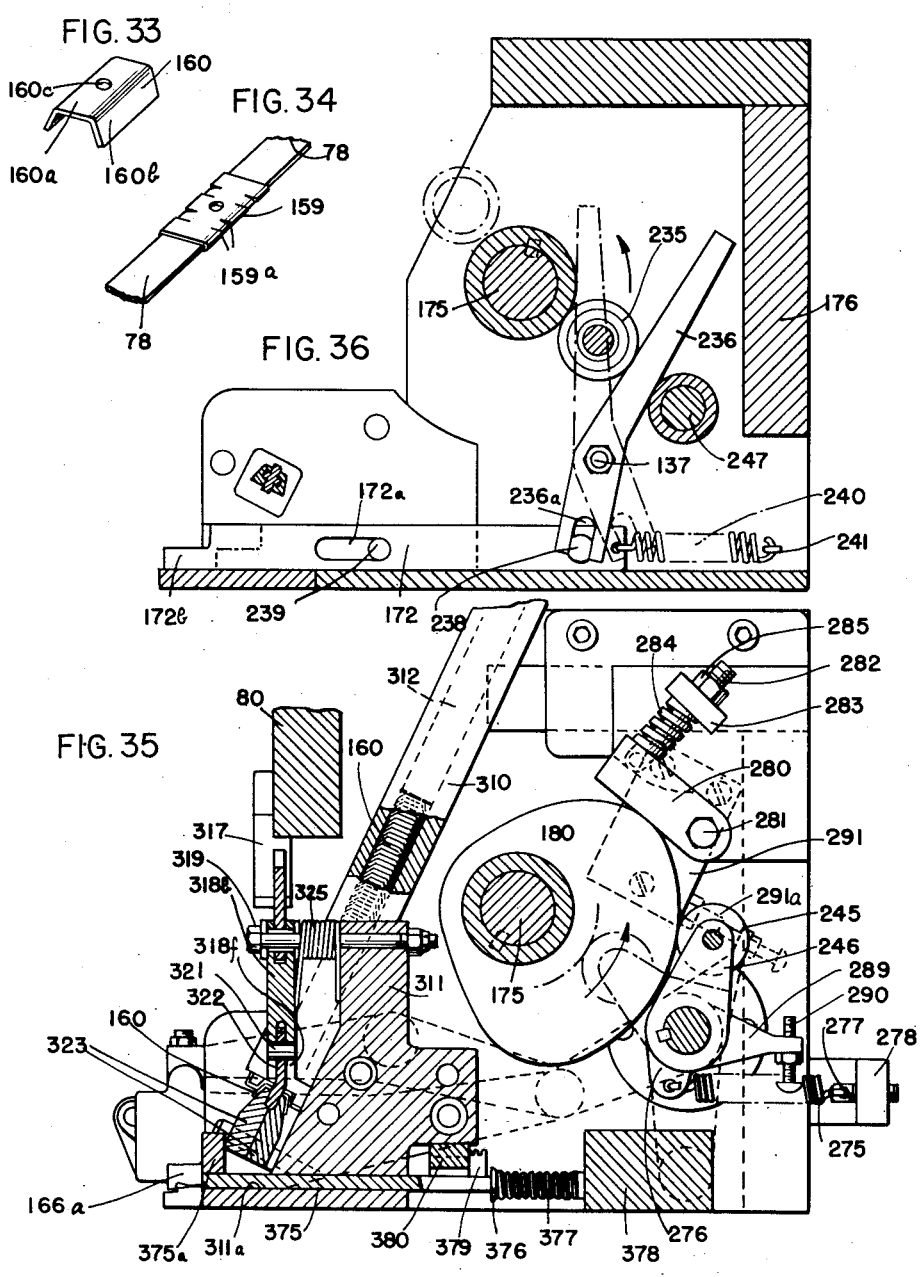

Oct. 1, 1957  J. N. WOGNUM ET AL  2,807,997
BOX STRAPPING MACHINE
Filed March 12, 1952  23 Sheets-Sheet 11

INVENTORS:
JAMES N. WOGNUM
THOMAS J. FULLERTON
WILLIAM B. AHERN
BY *Smith, Olsen & Baird,*
ATT'YS Oct. 1, 1957  J. N. WOGNUM ET AL  2,807,997
BOX STRAPPING MACHINE
Filed March 12, 1952

INVENTORS:
JAMES N. WOGNUM
THOMAS J. FULLERTON
WILLIAM B. AHERN
BY
ATT'YS

INVENTORS:
JAMES N. WOGNUM
THOMAS J. FULLERTON
WILLIAM B. AHERN
BY
ATT'YS

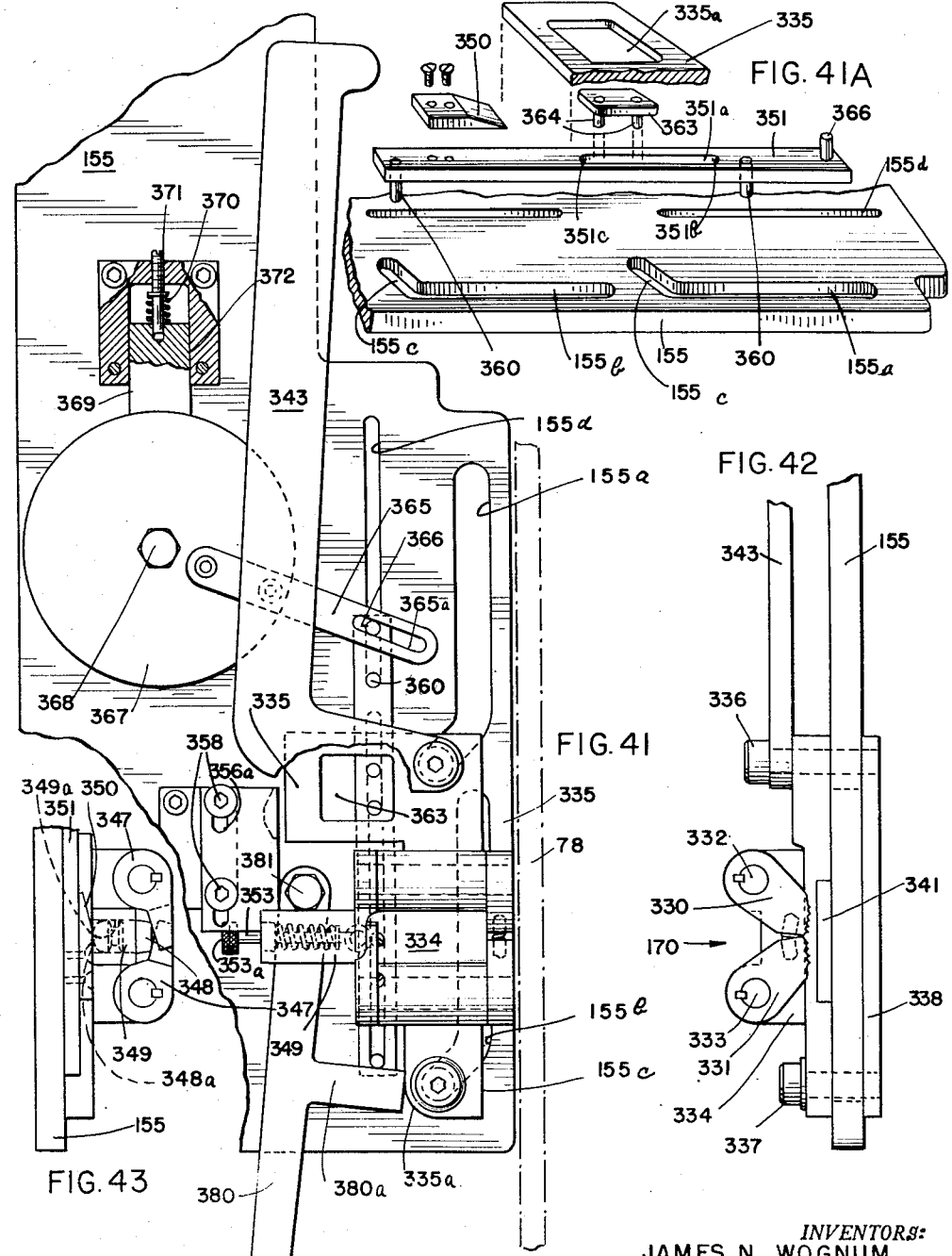

Oct. 1, 1957
J. N. WOGNUM ET AL
2,807,997
BOX STRAPPING MACHINE
Filed March 12, 1952
23 Sheets-Sheet 15
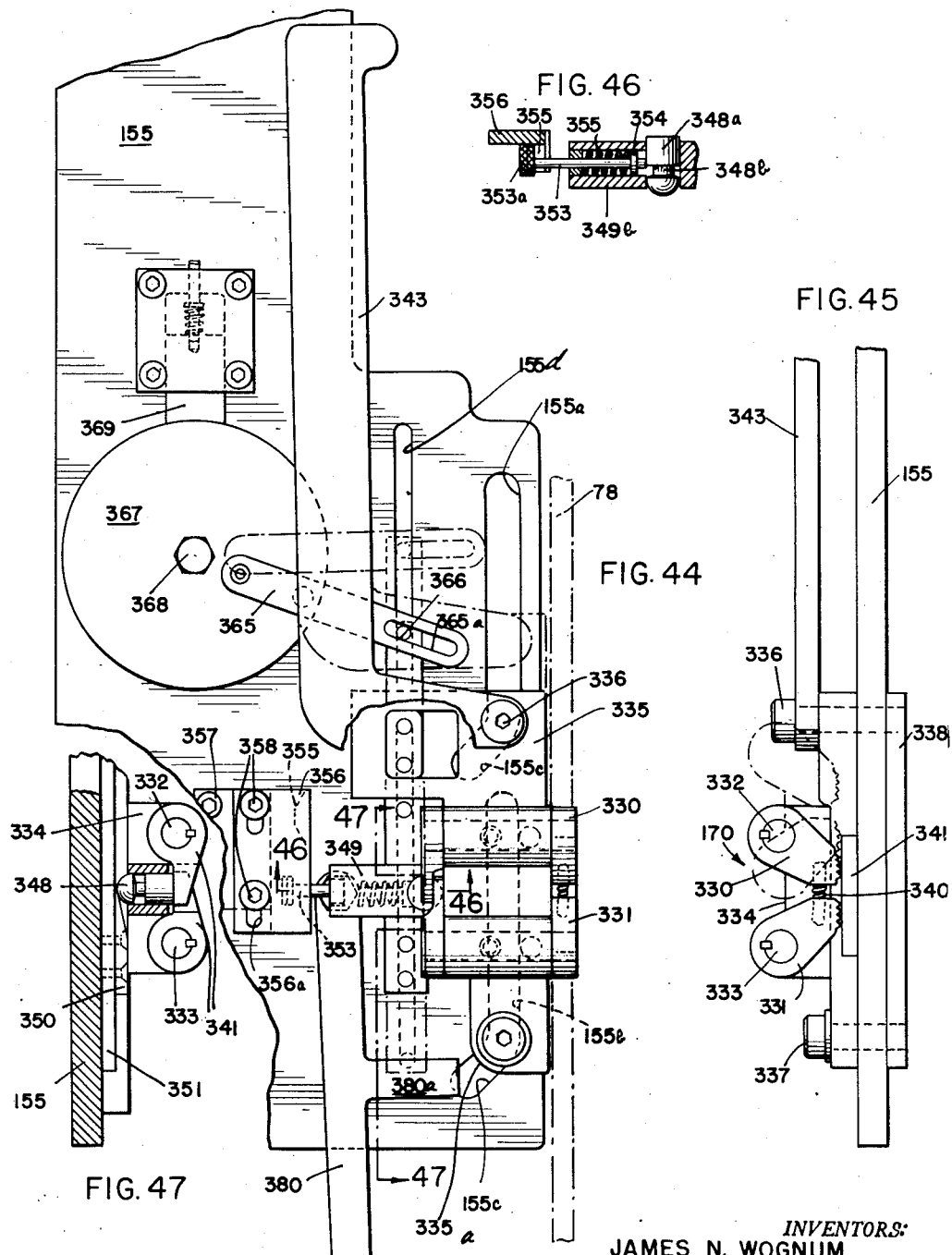
INVENTORS:
JAMES N. WOGNUM
THOMAS J. FULLERTON
WILLIAM B. AHERN
BY
Smith, Olsen & Baird,
ATT'YS

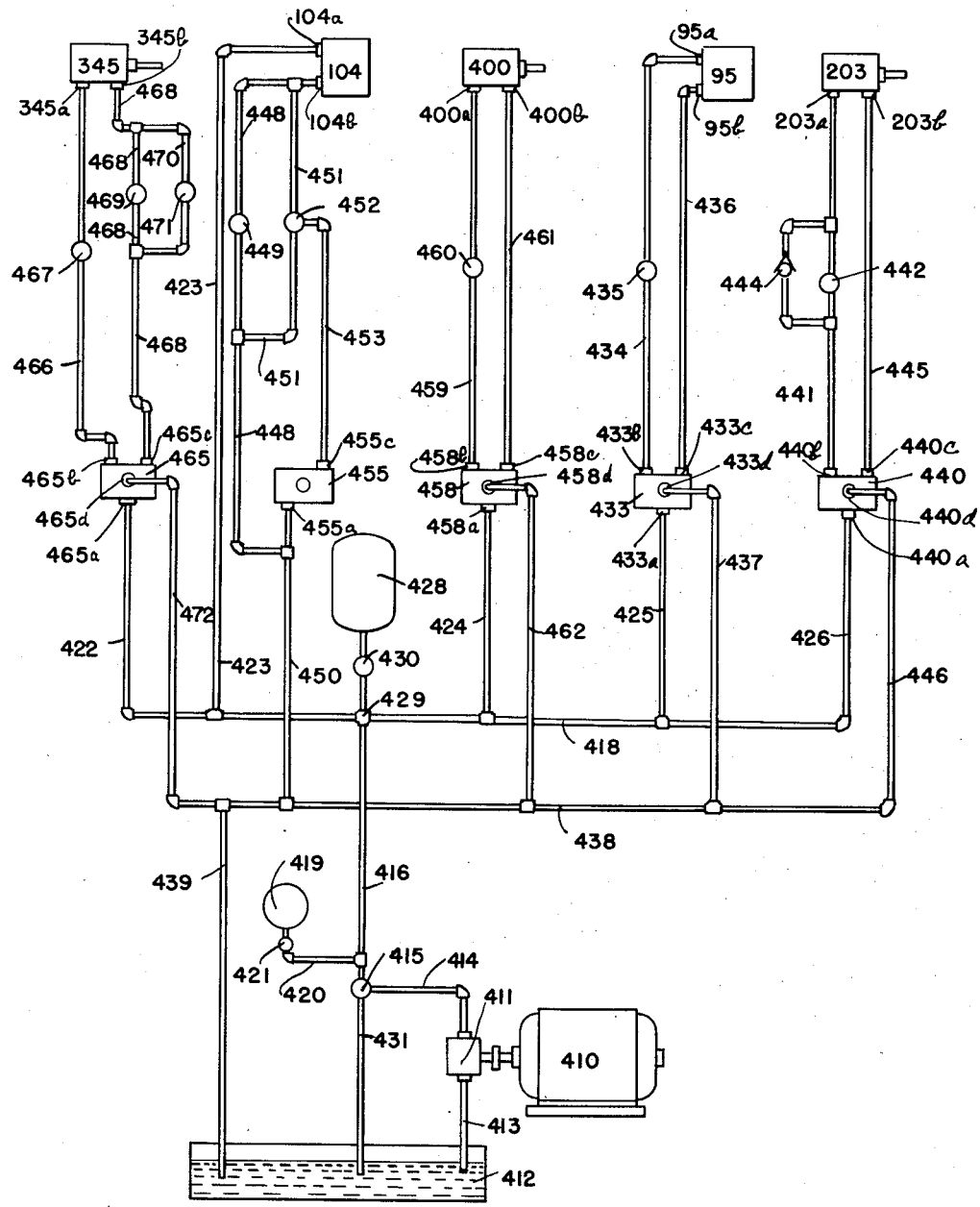

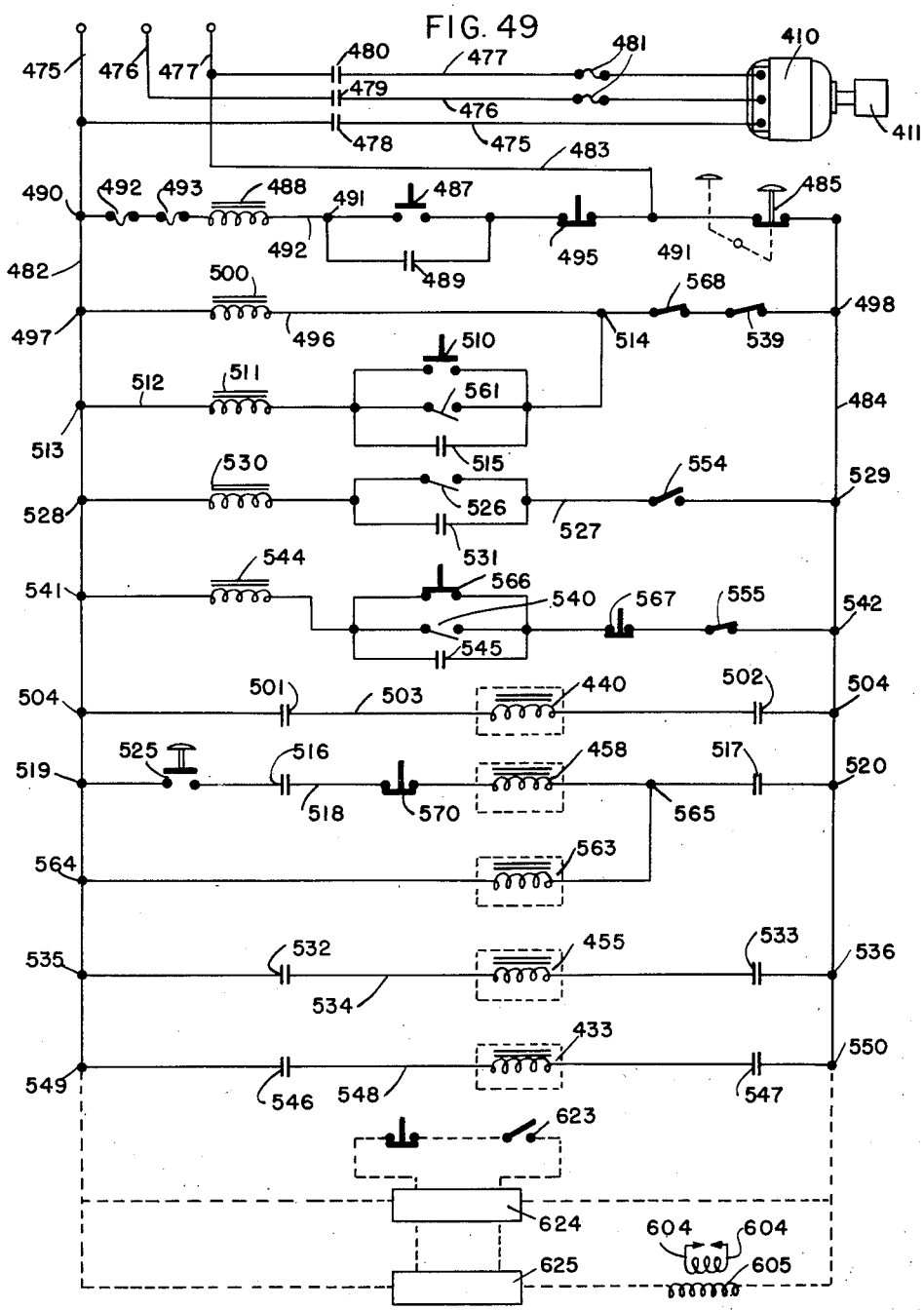

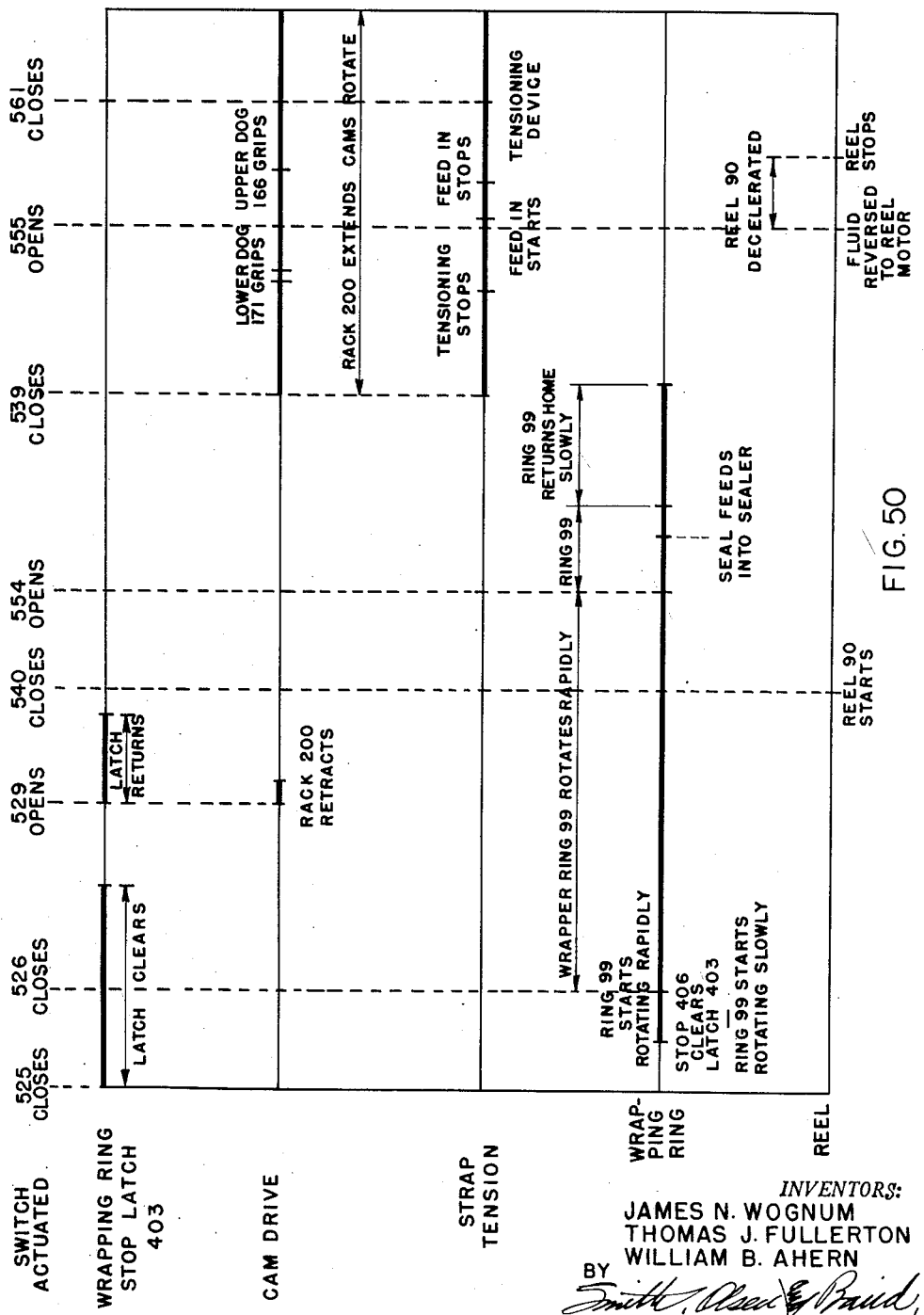

FIG. 51

| SWITCHES | SWITCHES | | SOLENOIDS | |
|---|---|---|---|---|
| 487 CLOSES | 489, 478, 479, 480 | CLOSE | 488 | ENERGIZED |
| 485 CLOSES | 501, 502 CLOSE | | 500, 440 | ENERGIZED |
| 510 CLOSES | 515, 516, 517 | CLOSE | 511, 563 | ENERGIZED |
| 525 CLOSES | | | | ENERGIZED |
| 526 CLOSES | 531, 532, 533 | CLOSE | 530, 455 | ENERGIZED |
| 539 OPENS | 501, 502, 515, 516, 517 | OPEN | 500, 511, 458, 440, 563 | DEENERGIZED |
| 540 CLOSES | 545, 546, 547 | CLOSE | 544, 433 | ENERGIZED |
| 554 OPENS | 531, 532, 533 | OPEN | 530, 455 | DEENERGIZED |
| 539 CLOSES | 501, 502 CLOSE | | 500, 440 | ENERGIZED |
| 555 OPENS | 545, 546, 547 | OPEN | 544, 433 | DEENERGIZED |
| 561 CLOSES | 515, 516, 517 | CLOSE | 511, 563 | ENERGIZED |

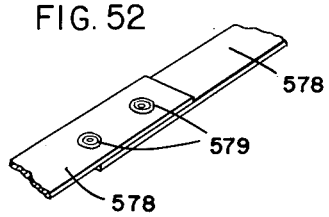
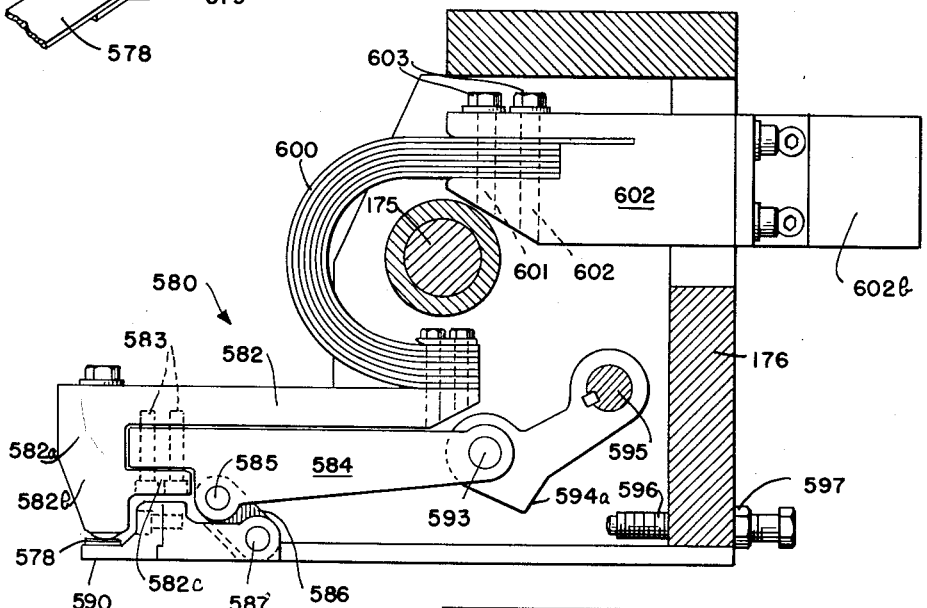
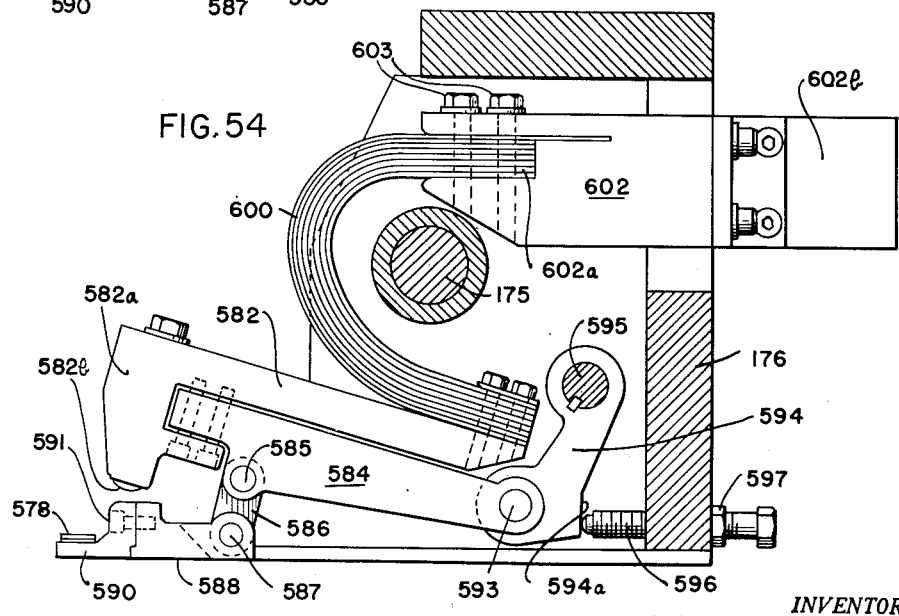

Oct. 1, 1957　　J. N. WOGNUM ET AL　　2,807,997
BOX STRAPPING MACHINE

Filed March 12, 1952　　23 Sheets-Sheet 21

*INVENTORS:*
JAMES N. WOGNUM
THOMAS J. FULLERTON
WILLIAM B. AHERN
BY
ATT'YS

Oct. 1, 1957   J. N. WOGNUM ET AL   2,807,997
BOX STRAPPING MACHINE
Filed March 12, 1952   23 Sheets-Sheet 22

*INVENTORS:*
JAMES N. WOGNUM
THOMAS J. FULLERTON
WILLIAM B. AHERN
BY
ATT'YS

Oct. 1, 1957  J. N. WOGNUM ET AL  2,807,997
BOX STRAPPING MACHINE
Filed March 12, 1952  23 Sheets-Sheet 23

*INVENTORS:*
JAMES N. WOGNUM
THOMAS J. FULLERTON
WILLIAM B. AHERN
BY
ATT'YS

United States Patent Office 2,807,997
Patented Oct. 1, 1957

2,807,997
BOX STRAPPING MACHINE

James N. Wognum, Chicago, and Thomas J. Fullerton, Palos Heights, Ill., and William B. Ahern, Madison, Wis., assignors to Acme Steel Company, Chicago, Ill., a corporation of Illinois Application March 12, 1952, Serial No. 276,162

34 Claims. (Cl. 100—27)

This invention relates to improvements in box strapping machines of the rotary ring type by which a metal binding strap is wrapped around a box or package, drawn taut and its overlapping ends then secured together.

The principal object of the invention is to provide a machine of the type referred to which is fully automatic in that the operations of wrapping the strap around the package under tension, drawing it taut to a further extent after the wrapping is completed, cutting off the strap and forming a joint between its overlapping ends, are carried on in sequence without attention on the part of the operator except that required to initiate the cycle. A further object of the invention is to provide a box strapping machine of the rotary ring type comprising a supply reel and a wrapping ring, which rotate in the same direction, in combination with a transfer device which also travels in that direction and transfers the metal strapping from the reel to the wrapping ring and maintains tension in the strap while it is being wrapped around a box or package supported in the aperture of the ring structure. Another object of the invention is to provide a machine of the type referred to comprising means for holding the free end of the strap, means for wrapping the strap around a package and causing a portion thereof to overlap said end, and means for then gripping the supply portion of the strap and drawing it taut around the package preliminary to cutting off the strap and forming a joint. Still another object of the invention is to provide improved tensioning mechanism for drawing the strap taut after it has been wrapped around a package and for positioning the end of the strap for a succeeding operation after it has been severed and a joint formed. A further feature of the invention is the provision of a novel transfer device by which the metal strip is peeled off of the supply coil in a direction opposite to its winding in the coil and transferred to the wrapping ring, which rotates in the same direction as the coil, and at the same time, so that little tension is required to remove the strap from the coil, and the speed of wrapping is increased. Another object is to provide improved means for forming a joint between the overlapping strap ends. Another object is to provide a novel automatic system by which the sequence and time duration of the various operations performed by the machine are controlled in a predetermined manner. Other objects relate to various features of construction and arrangement which will appear more fully hereinafter.

The nature of the invention will be understood from the following specification taken with the accompanying drawings in which one embodiment of the invention and a modification of a portion thereof, are illustrated. In the drawings, Figure 1 shows a front elevation of the improved box strapping machine embodying the present invention;

Fig. 1A shows a side elevation, on an enlarged scale, of one of the devices for centering the axes of the guide wheels which form a part of the wrapping ring;

Fig. 2 shows a rear elevation of the machine illustrated in Fig. 1;

Fig. 3 shows an end elevation of the machine, looking toward the left as viewed in Fig. 1;

Fig. 4 shows a partial sectional view taken on the line 4—4 of Fig. 1;

Fig. 5 is a partial end elevation similar to that of Fig. 3 but showing the strap guides in full lines;

Fig. 6 is a partial sectional view on the line 6—6 of Fig. 5, showing one of the strap guides on an enlarged scale;

Fig. 7 is a perspective view of a box which has been bound by a metal strap with the use of the machine of the present invention;

Fig. 8 is a diagrammatic view of the ring structure of the machine showing the relative positions of the parts at the beginning of the operation of wrapping a metal strap around a box;

Figure 13:
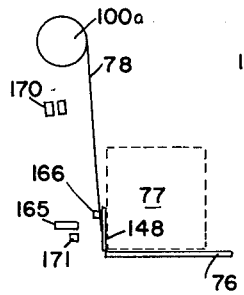
Figure 14:
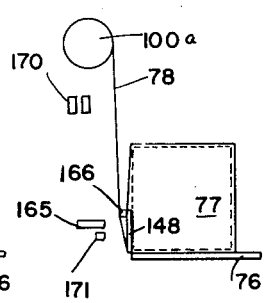
Figure 15:
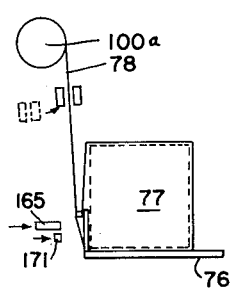
Figure 16:
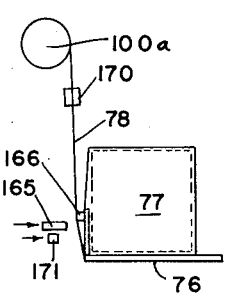
Figure 17:
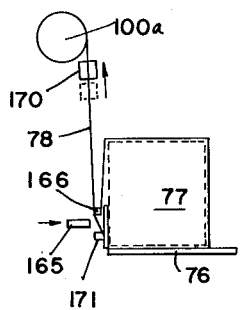
Figure 18:
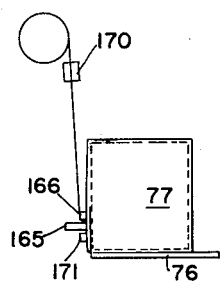
Figure 19:
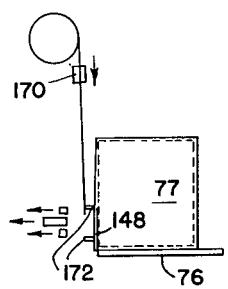
Figure 20:
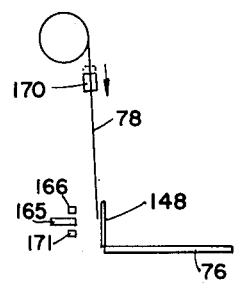
Figure 21:
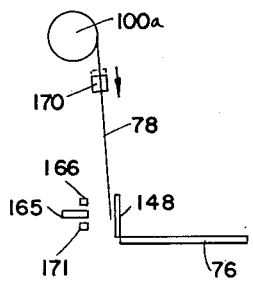
Figure 22:
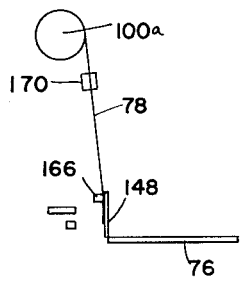
Figure 22A:
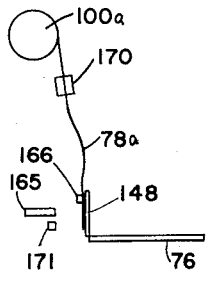
Figure 23:
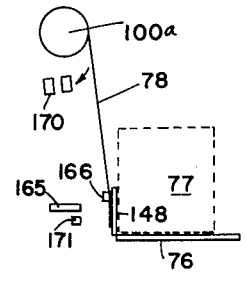
Figure 24:
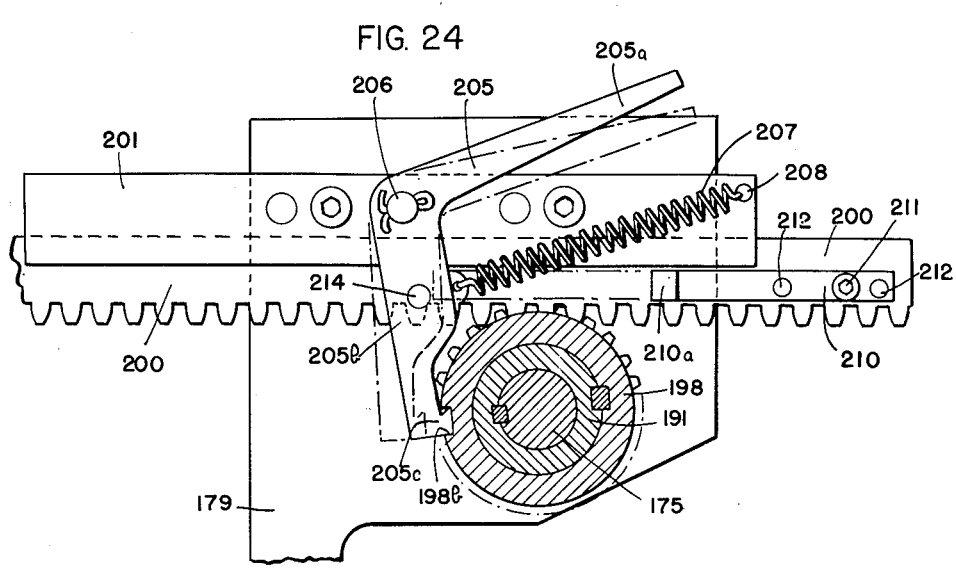
Figure 9A:
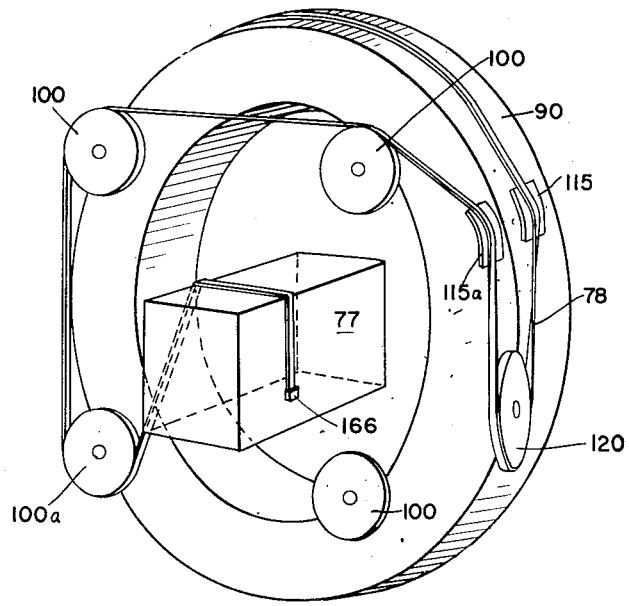
Fig. 9 is a view similar to that of Fig. 8 showing the relative positions of the parts after the metal strap has been passed part way around the box.
Figure 32:
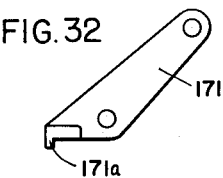
Figure 30:
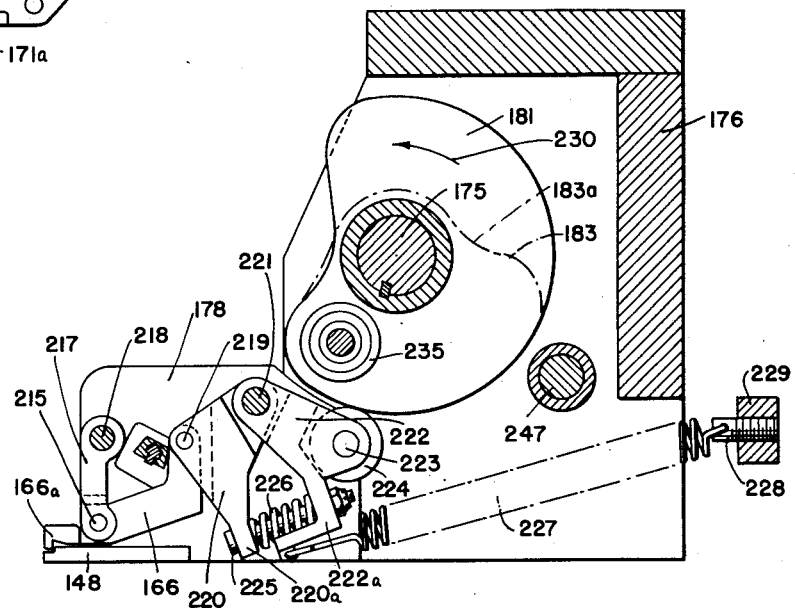
Figure 31:
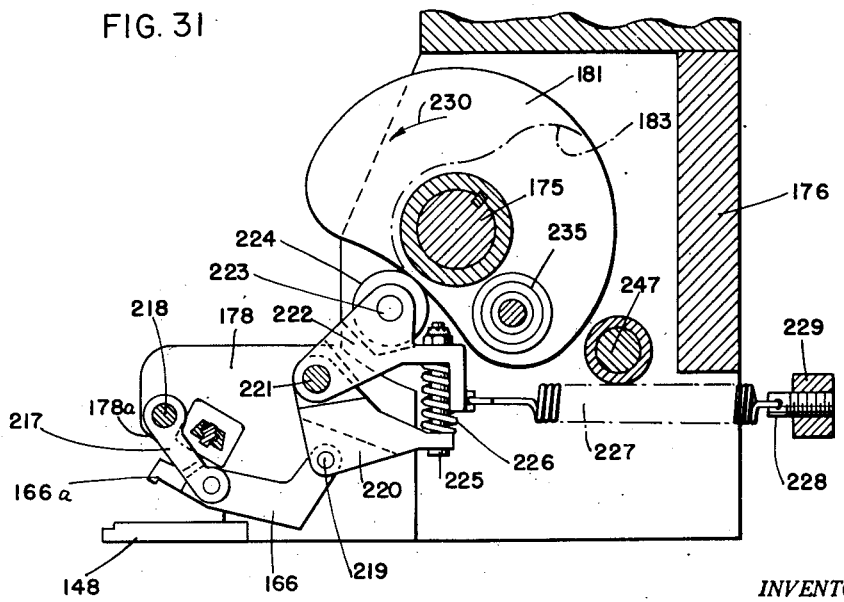
Figure 35A:
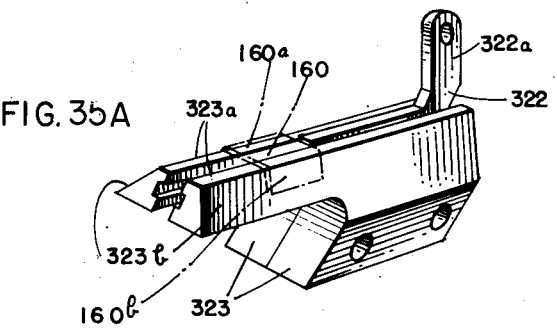
Figure 35B:
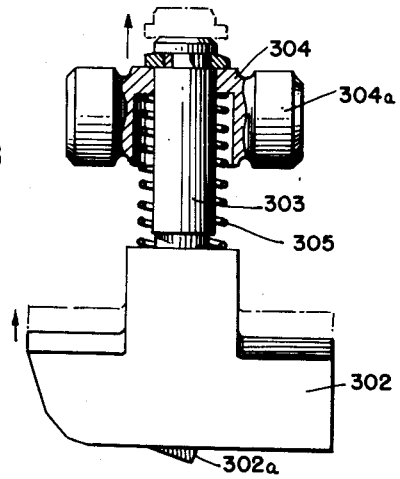
Figure 35C:
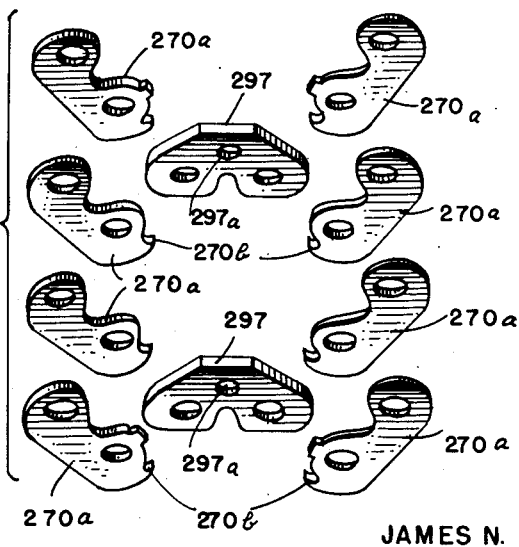
Figure 37:
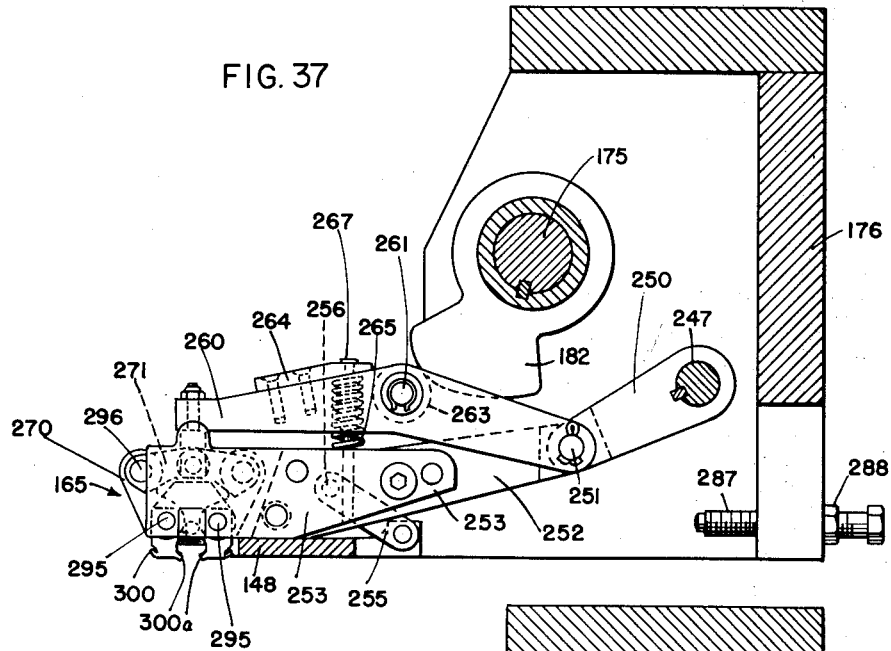
Figure 38:
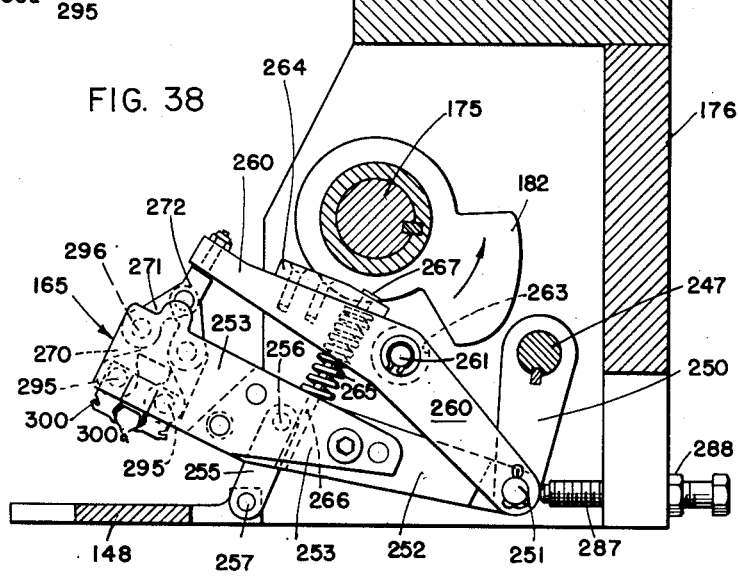
Figure 39:
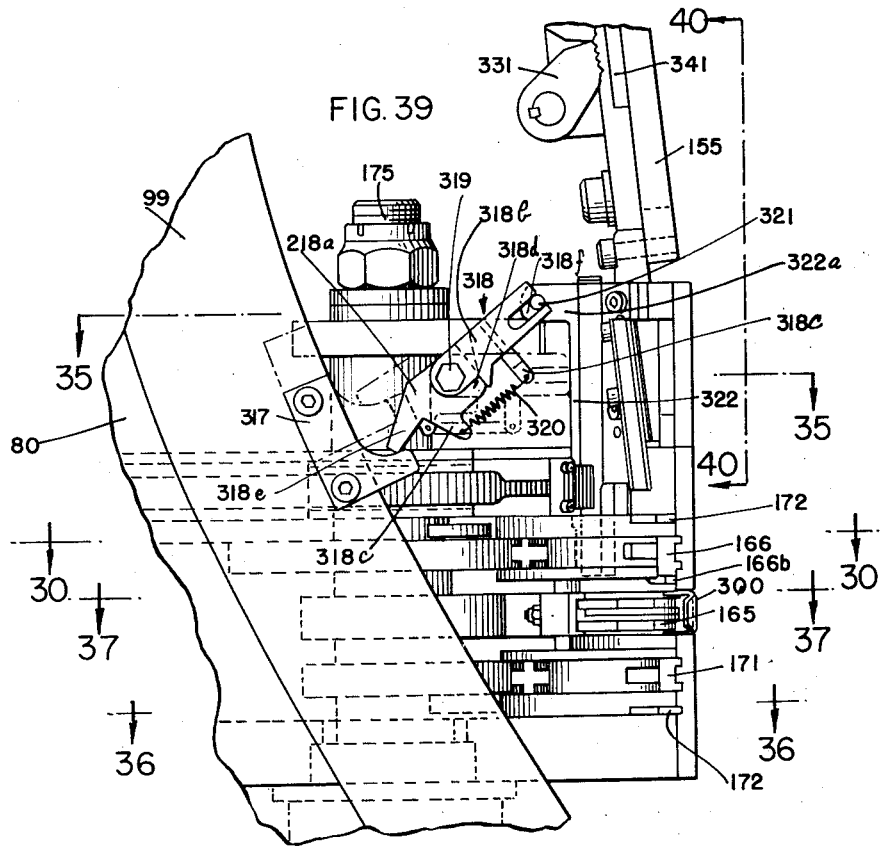

Fig. 9A is a somewhat diagrammatic perspective view of the ring structure of the machine and the box to be bound with the parts substantially in the relative positions shown in Fig. 9, illustrating the method of withdrawing the strapping from the supply reel and reversing its direction of movement about a transfer device from which it is carried to the guide wheels of the wrapping ring which serves to wrap the strap about the box as the ring is rotated;

Fig. 10 is a view similar to those of Figs. 8 and 9 showing the relative positions of the parts after the strap has been wrapped entirely around the box;

Fig. 11 is a view similar to that of Fig. 10 but at a later stage of the operation showing the relative positions of the parts after the excess of strapping supplied during the winding operation has been partially taken up by the rotation of the supply reel;

Fig. 12 shows a view similar to those of Figs. 10 and 11 illustrating the relative positions of the parts after they have been restored to the initial positions illustrated in Fig. 8, with the strap wrapped around the box in readiness for the formation of a joint between the overlapping strap ends;

Fig. 13 is a diagrammatic view showing a box on the supporting table of the machine in readiness to be bound with the free end of the metal strap extending from the first guide wheel or pilot wheel of the wrapping ring and held by a gripping device against the strap rest plate which extends upwardly at one side of the box, the parts being in relative positions corresponding to those shown in Fig. 8 preliminary to the winding operations, with the lower gripping dog, the sealing head and the tensioning device in their retracted positions;

Fig. 14 is a diagrammatic view similar to that of Fig. 13 showing the relative positions of the parts shown in Fig. 13 after the strap has been completely wrapped around the box with the supply portion thereof extending on the outer side of the upper gripping dog by which the free end of the strap is held;

Fig. 15 is a diagrammatic view similar to that of Fig. 14 showing the relative positions of the parts after the tensioning device has moved into operative relationship to the supply portion of the strap but with all of the other parts in the relative positions they occupy in Fig. 14;

Fig. 16 is a view similar to that of Fig. 15 showing the relative positions of the parts at a later stage, the only difference being that the tensioning device has been moved into gripping engagement with the supply portion of the strap preliminary to creating in the strap a greater degree of tension than that which is brought about by the wrapping operation;

Fig. 17 is a view similar to that of Fig. 16 showing the condition of the parts after the tensioning device has moved upwardly to draw the strap taut around the box or package and after the lower gripping dog has been moved into gripping engagement with the supply portion of the strap below the upper gripping dog;

Fig. 18 is a view similar to that of Fig. 17 showing the relative positions of the parts at a later stage when the sealing head has moved inwardly to engage the strap and form an interlocking joint and after the supply portion of the strap has been cut off adjacent the upper gripping dog;

Fig. 19 shows a view similar to that of Fig. 18 after the sealing head and the upper and lower gripping dogs have been retracted, after the ejectors have moved out to disengage the strap from the rest plate, and after the tensioning device has moved partially downward to position the free end of the strap in place for another operation;

Fig. 20 is a view similar to Fig. 19 showing the parts after the bound box has been removed from the table and after the free end of the metal strap has been moved further in a downward direction by the tensioning device;

Fig. 21 is a view similar to Fig. 20 showing the relative positions of the parts after the tensioning device has moved the free end of the strap downwardly to its final position in readiness for the next strapping operation;

Fig. 22 is a view similar to Fig. 21 except that the free end of the strap is now gripped by the upper gripping device so that it is held against the rest plate at the edge of the table;

Fig. 22A is a view similar to Fig. 22 after a further downward movement of the tensioning device which produces some slack in the strap above the upper gripping dog preliminary to the release of the strap by the tensioning device;

Fig. 23 shows the relative position of the parts following the condition shown in Fig. 22A, which then occupy the positions shown in Fig. 13 with a new box resting on the table ready for another strapping operation;

Fig. 24 is a sectional view taken on the line 24—24 of Fig. 1 showing a sectional view through the cam shaft of the machine by which various operations are controlled in sequence, illustrating particularly the means for stopping the cam shaft in a predetermined position after each revolution;

Fig. 25 shows an enlarged side elevation of the strap transfer device and brake mechanism, by which the transfer of the metal strapping from the supply reel to the wrapping ring is controlled, looking from the rear of the machine as in Fig. 2;

Fig. 26 shows an elevation of the transfer device illustrated in Fig. 25, looking toward the left as viewed in Fig. 25;

Fig. 27 shows a partial sectional view in partial elevation of the cam shaft and associated parts by which various operations of the machine are controlled;

Fig. 28 shows an elevation of an auxiliary shaft which is operated by one of the cams mounted on the cam shaft illustrated in Fig. 27, with associated parts of the frame structure shown in vertical section;

Fig. 29 shows an exploded perspective view of various cams and associated parts which are operated or controlled by the cam shaft shown in Fig. 27;

Fig. 30 shows a horizontal sectional view taken on the line 30—30 of Fig. 39 illustrating in plan view the mechanism by which the upper gripping dog is actuated and controlled;

Fig. 31 shows a view similar to that of Fig. 30 after the operating cam has rotated to a position to permit the withdrawal of the gripping dog from its gripping position;

Fig. 32 shows a side elevation of the lower gripping dog which is actuated by a mechanism similar to that shown in Figs. 30 and 31 where the operating cam for this gripping dog is shown by dotted lines;

Fig. 33 shows a perspective view of the type of metal seal which is preferably employed in forming a joint between the overlapping strap ends;

Fig. 34 shows a perspective view of the overlapping strap ends and the enclosing seal after the seal has been bent around the strap ends and the edges of the strap and seal have been deformed to provide an interlocking joint;

Fig. 35 shows a horizontal section taken on the lines 35—35 of Fig. 39 with parts in plan view, illustrating the means for feeding seals to the sealing head and the means for operating the sealing mechanism by which an interlocking joint is formed between the strap ends;

Fig. 35A shows a perspective view of the guide block and the feeding device by which the seals are moved from the bottom end of the storage chamber to the jaws of the sealing device;

Fig. 35B shows an enlarged side elevation of the bridge device which guides and positions a seal between the jaws of the sealing device;

Fig. 35C shows a perspective view of the relatively movable jaws of the sealing device illustrated in Fig. 35B;

Fig. 36 is a sectional view taken on the line 36—36 of Fig. 39 showing the lower strap ejecting mechanism;

Fig. 37 is a sectional view taken along the line 37—37 of Fig. 39 showing the sealing device after it has been moved to sealing position by the operation of its associated cam;

Fig. 38 is a view similar to that of Fig. 37 showing the sealing device in its retracted position;

Fig. 39 shows an elevation on an enlarged scale of portions of the control mechanism operated by the cam shaft and other parts associated therewith, looking from the rear side of the machine.

Figure 40:
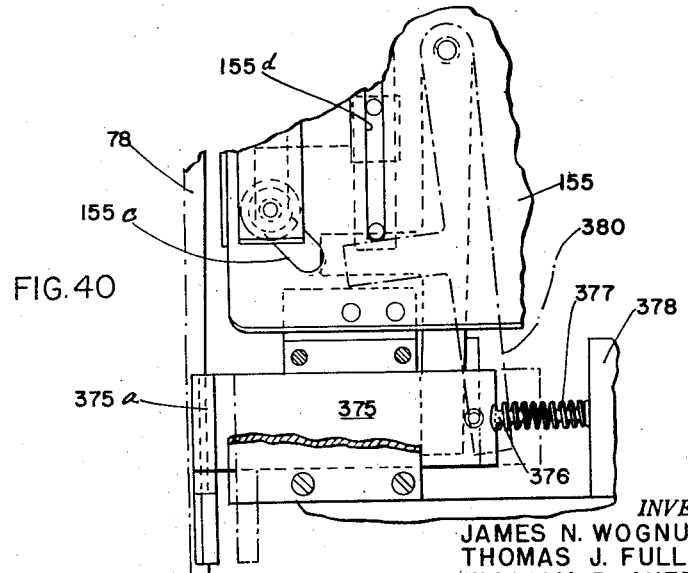
Figure 55:
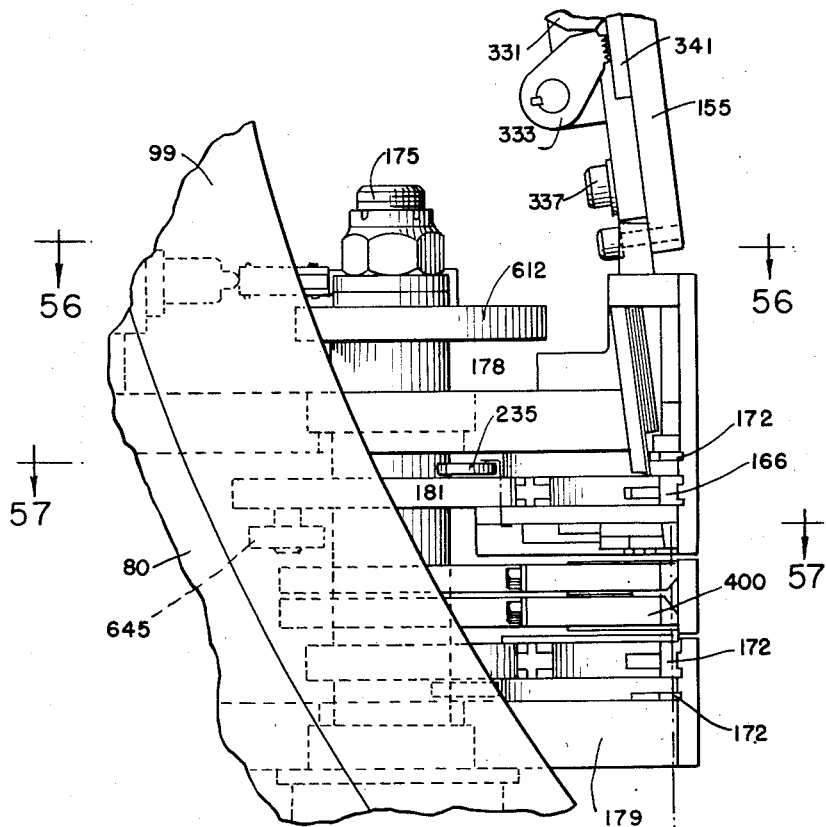
Figure 57A:
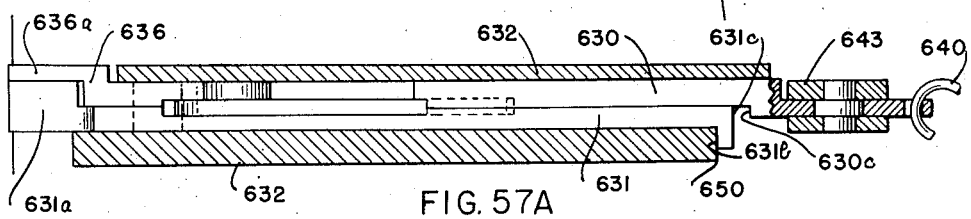
Figure 59:
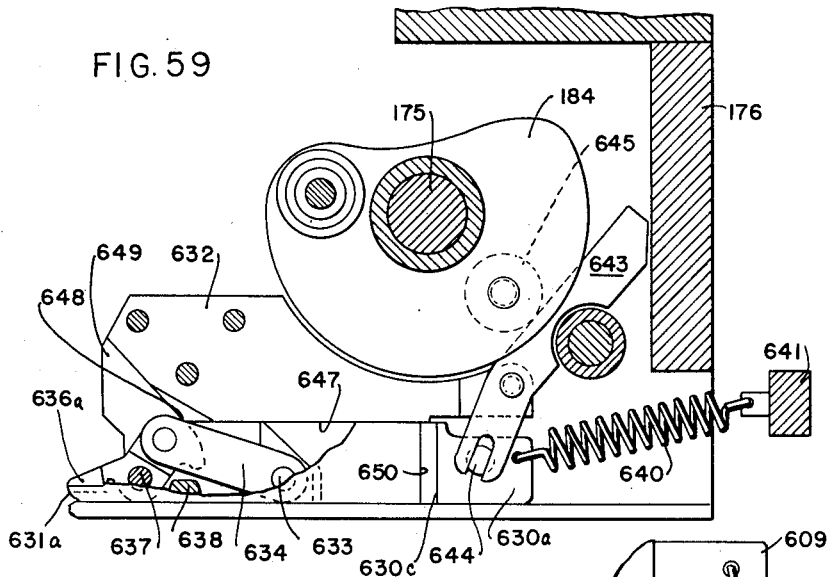
Figure 56:
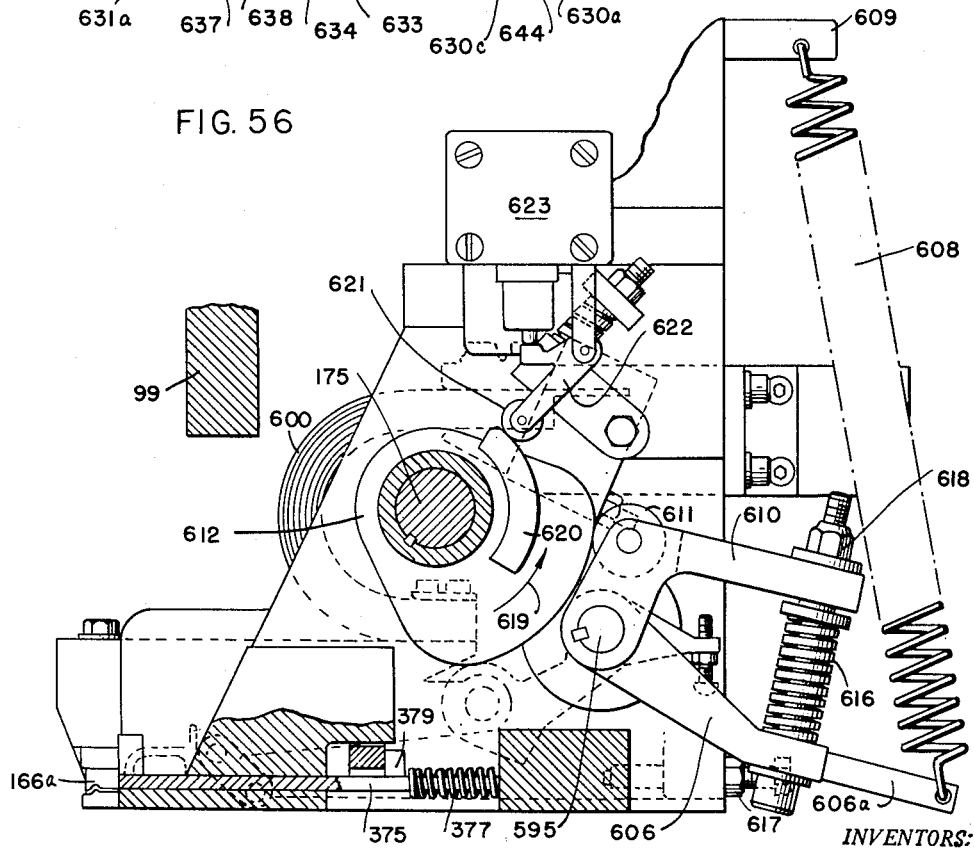
Figure 57:
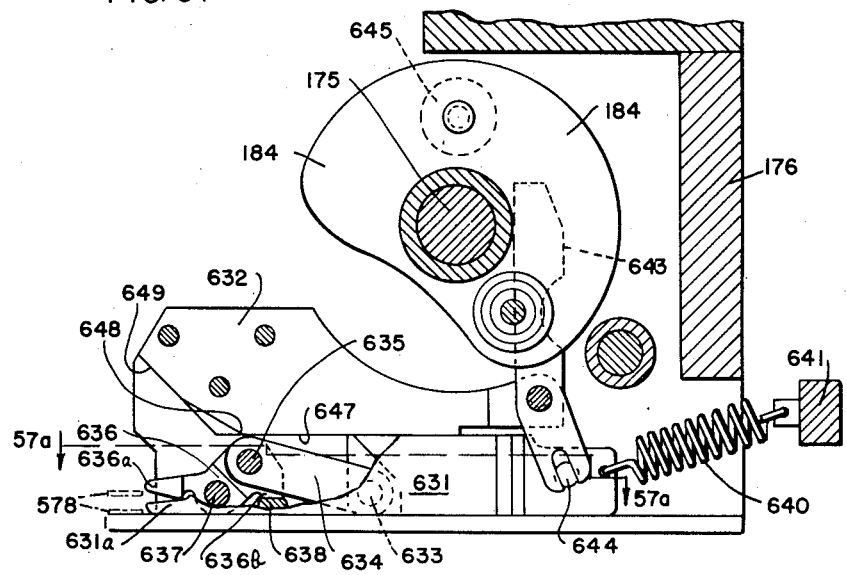
Figure 58:
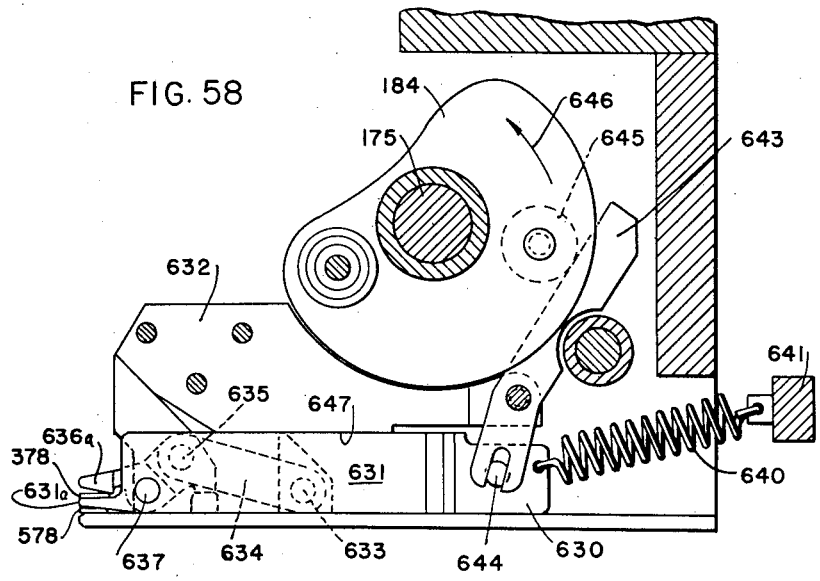

Fig. 40 shows an elevational view along the line 40—40 of Fig. 39 illustrating parts of the strap tensioning device by which the strap is drawn taut after it has been wrapped around the package;

Fig. 41 shows a partial sectional view and partial elevation of a portion of the strap tensioning device looking toward the left as viewed in Fig. 1;

Fig. 41A shows an exploded perspective view of portions of the strap tensioning device illustrated in Fig. 41;

Fig. 42 shows an end elevation of the device illustrated in Fig. 41, looking toward the left as viewed in Fig. 41;

Fig. 43 shows a partial edge elevation of a part of the mechanism illustrated in Fig. 41, looking toward the right as viewed in Fig. 41;

Fig. 44 is an elevation similar to that of Fig. 41 showing parts of the strap tensioning device in the relative positions which they occupy after the supply end of the strap has been fed back to a position to be held by the upper gripping dog preliminary to a new strapping operation;

Fig. 45 is an edge elevation of the structure illustrated in Fig. 44 looking toward the left as viewed in Fig. 44;

Fig. 46 is a detailed sectional view taken on the line 46—46 of Fig. 44 showing the latching mechanism associated with the gripping dogs of the tensioning device;

Fig. 47 shows a sectional view taken on the line 47—47 of Fig. 44;

Fig. 48 shows a schematic diagram of the hydraulic circuit by which various operations of the machine are effected and controlled;

Fig. 49 shows a schematic diagram of the electric circuit by which various operations of the machine are actuated and controlled;

Fig. 50 is a chart showing approximately the sequential operation of the various units of the machine during the performance of a complete strapping cycle;

Fig. 51 is a chart showing which switches and solenoids are operated in response to the manual operation or the automatic operation of other switches embodied in the electric control circuit;

Fig. 52 shows a perspective view of overlapping strap ends which are united by spot welds, an arrangement which may be employed in place of the sealed joint illustrated in Fig. 34;

Fig. 53 shows a horizontal section through the cam housing and cam shaft illustrating a form of welding mechanism which may be employed in place of sealing mechanism to produce the type of joint wherein the ends of the strap are united by spot welds, the welding mechanism being shown in its operative position;

Fig. 54 is a view similar to that of Fig. 53 illustrating the welding mechanism in its retracted position;

Fig. 55 is an elevation showing the parts illustrated in Fig. 39 except that parts thereof have been modified to permit the formation of a welded joint by the type of mechanism illustrated in Figs. 53 and 54;

Fig. 56 shows a sectional view similar to that of Fig. 35 except that the welding mechanism shown in Figs. 53 and 54 has been substituted for the sealing mechanism shown in Fig. 35, this section being taken along the line 56—56 of Fig. 55;

Fig. 57 is a sectional view taken on the line 57—57 of Fig. 55, showing the shearing mechanism associated with the welding mechanism by which the strap is severed;

Fig. 57A is a horizontal section taken on the line 57A—57A of Fig. 57;

Fig. 58 is a view similar to that of Fig. 57 with the shearing mechanism extended into operative relationship with the strap to be severed;

Fig. 59 is a sectional view similar to that of Fig. 57 with the shearing mechanism in the extreme position which it occupies after the strap has been sheared.

As illustrated in the accompanying drawings, the invention is embodied in a machine comprising a circular structure 75 having a central opening 75a in which there is mounted a table 76 adapted to support the box or package 77 to be bound by the metal strap 78 (see Figs. 1 and 2). A box or package 77 bound by a length of metal strap 78 which has its ends united by a metal seal 159 is shown in Fig. 7, and it is the function of this machine to apply the strap, draw it taut, cut it off from the supply, and to form the joint in a continuous automatic cycle of operations.

The annular structure 75 comprises a circular frame 80 of angular cross section (Fig. 4) which is supported on the floor or foundation by a pair of outer standards 81 and by a pair of inner standards 82 secured to the frame by studs 83. The outer cylindrical portion of the frame 80 has secured thereto by studs 84 four L-shaped brackets 85 having inwardly extending portions 85a having yoke shaped extremities 85b in which are fixed shafts 87 on which are mounted ball bearing rollers 88. These rollers support the strap reel 90 by engagement with an annular groove in the cylindrical rim 90a thereof and this bearing surface of the reel is maintained in clean condition by flexible inclined brushes 91 (Fig. 2) which are attached to the brackets 85 and bear upon the rim. The reel 90 has an annular storage recess or chamber 90b in which a supply of metal strapping 78 is coiled. The rim 90a of the reel has an annular groove 90c in its outer surface provided with outwardly diverging walls which are engaged by an endless driving belt 92 (Figs. 1, 2, 3 and 4) arranged to extend around a grooved driving pulley 93 fixed on the shaft of a hydraulic motor 95. This motor is adapted to be actuated in proper time to rotate the reel and thereby rewind excess strapping thereon after the wrapping ring 99 has peeled it off.

The radial body portion 80a of the annular frame 80 is provided around its inner edge with an annular groove 80b in which four ball bearing rollers 97 are arranged to travel. These rollers are mounted on four shafts 98 which are secured in equally spaced apertures formed in the wrapping ring 99. The smaller inner ends of these shafts have secured thereon four strap guide wheels 100 of which one wheel 100a serves as the pilot wheel in leading the strap around the package. The outer ends of the shafts 98 have flat heads 98a, each of which is provided with an annular series of equally spaced notches 98b (see Fig. 1A) and one notch of each is engaged by a pin 101 which is detachably secured in a hole in the wrapping ring 99. The outer end 98c of each shaft which engages the ring 99 are eccentric to the inner end 98d upon which a roller 97 is mounted so that by removing the pins 101 and adjusting the shafts 98 the rollers 97 may be caused to bear equally upon the bearing groove 80b of the frame.

The wrapping ring 99 is provided in its outer edge with an annular V-shaped groove 99a engaged by an endless belt 102 which extends downwardly and around a driving pulley 103 fixed on the shaft of a hydraulic motor 104 which is actuated at the proper time during the wrapping cycle.

As the strap is taken off of the reel 90 it is reversed in direction and transferred to the guide wheels 100 of the wrapping ring by means of a transfer device 105 which also serves as a brake to maintain the strap in a taut condition as it is wrapped around the package. This transfer device is mounted to travel on a ring or track member 106 which is attached to the edge of the cylindrical portion of the frame 80 by studs 107 as shown in Figs. 2 and 4. This transfer and brake device is shown particularly in Figs. 25 and 26 where it is illustrated as comprising an arcuate frame member 108 which conforms to the curvature of the inner transversely extending annular flanges 106a of the track member 106 upon which it is arranged to travel. An upper brake lining 109 and a lower brake lining 110 (as viewed in Fig. 25), both formed of material having a relatively high coefficient of friction, are secured to the outer face of the frame member 106 and are adapted to coact with the inner surface 106b of the ring 108 to provide adequate braking action as hereinafter described.

The frame member 108 is provided at its upper end with two laterally projecting arms 108a having extensions 108b extending on opposite sides of the track member 106 and provided at their outer ends with pins 111 on which are mounted rollers 112 arranged to travel on the outer circumferential surfaces of the flanges 106a of the track member. The arms 108a also have brackets 114 secured to their outer ends and one of these carries the inner strap guide 115 while the other carries an outer strap guide 115a. Each strap guide comprises a curved plate 116 over which the strap 78 is adapted to slide. To the lower ends of the plates 116 bars 117 are secured by bolts 118 and these bars are spaced from the plates by washers 119, thus providing slots through which the strap is adapted to travel freely. As the strap 78 is withdrawn from the reel 90 it passes through the inner guide 115, then around a pulley 120 and then in the reverse direction through the outer guide 115a, as shown by the arrows 121 in Fig. 26. The strap is thus reversed in direction by the transfer device 105 as it travels from the outer guide 115a to the guide wheels 100 carried by the wrapping ring 99.

The reversing pulley 120 is mounted on a shaft 122 extending between the side walls 123a of a pulley frame 123 which is provided at its upper end (as viewed in Figs. 25 and 26) with a cylindrical portion 123b having a sliding engagement with an aperture in a bracket 124 secured to an intermediate part of the frame 108. At its lower end the pulley frame terminates in a cylindrical portion 123c which slidably engages an aperture in a block 125 which is pivoted between two abutting L-shaped links 126 by means of a pin 127. The portion 123 of the pulley frame which projects below the block 125 has a coil spring 128 mounted thereon and a nut 129 is capable of adjustment on the threaded end of the portion 123c to regulate the normal compression of the spring between this nut and the block.

The left hand ends of the links 126, as viewed in Fig. 25, are pivotally connected by pins 130 to the lower extremities of two diverging arms 108c which are formed at the lower end of the frame member 108 and which extend on opposite sides of the track member 106. At points above the pins 130 the links 126 are pivotally connected by pins 131 to two brake shoes 132 which are located on opposite sides of the track 106 and adapted to coact with the outer circumferential surfaces of the flanges 106a. At their intermediate points the links 126 are connected by a bolt 133 which pivotally engages the shouldered head of a pin 134 upon which there is mounted a coil spring 135. The other end of this spring has a telescoping engagement with the head of an adjusting screw 136 having a flange against which the spring seats. This screw threadedly engages a bracket 137 which is secured by studs 138 to the frame member 108. A cam 140 having an inclined cam surface 140a is also secured to the frame member 108 at this point for a purpose hereinafter described.

A U-shaped strap guide 141 is mounted on the lower part of the pulley frame 123 with its ends secured by bolts 142 to a bracket 143 secured to one of the side walls 123a and this strap guide partially enters the groove of the pulley so that the strap 78 is confined as it is threaded around the pulley and this operation thereby simplified.

In the operation of the transfer device 105 shown in Figs. 25 and 26, the coil spring 135 is adjusted by regulating the stop screw 136 to cause the brake shoes 132 to set up such a pressure between the brake linings 109 and 110 and the track member 106 that the resistance to movement of the transfer device will produce the desired degree of tension in the strap as it is wrapped around the package. When the strap is traveling in the direction of the arrows 121 in Fig. 26 and the wrapping ring 99 is rotating, the pulley frame 123 slides upwardly through the block 125 and the bracket 124 against the pressure of the spring 128 which acts primarily as a shock absorber and a strap slack take-up. As the pulley frame moves upwardly in the block 125, however, it causes this block to actuate the links 126 in a counterclockwise direction to relieve the normal pressure of the brake shoes and the brake linings upon the flanges of the track member 106 so that the pull on the strap then drags the transfer device 105 around the track member. When the strap tension diminishes sufficiently, the spring 135 again extends to apply a normal pressure of the brake shoes 132 and the linings 109 and 110 upon the flanges 106a so that the transfer or braking device 105 is then brought to rest. The parts of the transfer device 105 are preferably made of light weight material, such as aluminum, so that it has little inertia and is quickly responsive to changes in the tension in the strap.

Having described the primary movable parts of the machine, a general recital of the various steps of the strapping cycle will be given before proceeding with a further detailed description of other parts and of the controlling mechanisms.

Before starting a strapping cycle, a box or package 77 to be bound is placed on the table 76 which is supported by frame members 145 from a shelf 146 which is supported by brackets 147 secured to the frame 80, as shown in Fig. 1. The box 77 is adapted to overlap the edge of the table 76 to permit the wrapping of the strap around it and its projecting edge may be supported by a conveyor or other device, not shown. Having placed the box 77 on the table, it is pushed toward the right as viewed in Fig. 1 against a vertical strap rest plate 148 and is held there by an arm 150 which has a head 150a slidably mounted on a horizontal bar 151 extending across the front of the machine with one end attached at 152 to the frame 80 and with the other end attached at 153 to a bar 155 which extends downwardly from a bracket 156 secured to the upper part of the frame. When the box is positioned the arm 150 may be secured on the bar 151 by a hand operated set screw 157 or the operator may hold the arm in position during the strapping cycle. When the strapping is completed, the arm 150 is retracted and its movement in this direction is preferably limited by a stop member 158 secured to the bar 151.

The strap 78 may be wrapped around the box 77 in the manner shown in Fig. 7 and, after it has been drawn taut, its ends are secured together to form a joint 159 which may be formed by the use of a channel shaped seal 160, shown in Fig. 33, which is more particularly disclosed in United States Letters Patent No. 2,062,098, dated November 24, 1936. This seal has a top wall 160a and flaring side walls 160b and, in the operation of forming the joint, the side walls are bent around the overlapping strap ends and the edges of the seal and the enclosed strap ends are then sheared and deformed, as shown at 159a in Fig. 34, to form the type of interlocking joint which is disclosed in said Letters Patent. Other types of joints may be used in the machine but in the form shown in Figs. 1 to 51, inclusive, a sealing device 165 is provided for producing the type of joint shown in Fig. 34.

The strapping cycle may best be understood by reference to the diagrammatic views of Figs. 8 to 23, inclusive, which are views looking from the rear of the machine, as in Fig. 2. With the box 77 positioned on the table in readiness to be strapped, as in Fig. 8, the free end of the strap is held against the plate 148 by the upper gripping device 166 and it is then looped over the pilot wheel 100a on the wrapping ring 99. The strap then leads from the pilot wheel 100a around two other guide wheels 100 to which it passes from the transfer device 105, previously described. The strap, which extends around the pulley 120 of this device, comes from the reel 90 and engages the inner and outer guides 115 and 115a in the manner best shown in Fig. 9A, which illustrates a later period of the cycle.

With the parts in the positions shown in Fig. 8, the cycle is started by rotating the wrapping ring 99 in the direction of the arrow 167 with the result that the strap 78 is peeled from the coil on the reel, in a direction opposite to that of its winding, and is wrapped around the box. In Figs. 9 and 9A, the strap has been extended partially around three sides of the box with the wrapping operation being led by the pilot wheel 100a, which also pulls the transfer device around on its track 106. In Fig. 10, the strap has been wrapped completely around the box and the pilot wheel 100a has returned to the initial position shown in Fig. 8.

At this time, the transfer or braking device 105, which has been pulled around by the pilot wheel 100a and which has maintained tension in the strap, will not have returned to its initial position and more strap will have been removed from the reel than has been required for the wrapping of the box. Before reaching the stage shown in Fig. 10, the reel 90 starts to rotate in the direction of the arrow 167 and this rotation continues after the rotation of the wrapping ring 99 has stopped and at that time both the pilot wheel 100a and the reel 90 pull the transfer device 105 around on its track. Then when the wrapping is completed, as shown in Fig. 10, the rotation of the reel 90 continues and carries with it the transfer device 105 as shown in Fig. 11 until, finally, the transfer device is restored substantially to its initial position as shown in Fig. 12 and the rotation of the reel is then arrested by the engagement of the previously mentioned cam 140 on the transfer device (see Fig. 25) with a switch 555 in the control circuit which is located adjacent to the annular track 106. By this time the reel 90 will have rewound any excess of strapping which has peeled off during the wrapping operation. Since the wrapping ring 99 and the reel 90 rotate together during a part of the cycle, the excess of strap peeled from the reel is minimized and the cycle is quickly concluded after the wrapping is completed so that the time required for wrapping a box and preparing for the next cycle is reduced to a minimum. The electric and hydraulic systems by which the sequence and time duration of the steps of the cycle are effected and controlled will be described hereinafter.

The operation of the part by which the strap is held, drawn taut, cut off, and a joint formed therein, in relation to the steps of the wrapping cycle, which have just been described, are illustrated diagrammatically in Figs. 13 to 23, inclusive. In Fig. 13 the box 77 is resting on the table 76 and the free end of the strap 78 is held against the rest plate 148 by the upper gripping dog 166 and the strap extends upwardly to the wrapping ring, as in Fig. 8, preliminary to the first step of the wrapping cycle. At this time, the sealing device 165 by which the joint is formed, the tensioning device 170 by which the strap is drawn taut at the end of the wrapping cycle and the lower gripping dog 171 which holds the supply portion of the strap when the wrapping is completed are shown in their retracted positions.

In Fig. 14, the wrapping has been completed and the parts are in relative positions corresponding to those shown in Fig. 12. The strap 78 then leads from the pilot wheel on the outside of the upper gripping dog 166 and the strap then extends completely around the box to the place where its free end is held by that gripping dog.

In Fig. 15 the parts are shown in substantially the same relationship that they had in Fig. 14 except that the tensioning device 170 has been moved so that its gripping dogs embrace the strap 78 in readiness to grip it for drawing the strap taut around the box 77 following the completion of the wrapping operation. In Fig. 16, the parts are in the same relative positions as they are in Fig. 15 except that the gripping dogs of the tensioning device 170 have been moved into engagement with the portion of the strap which extends from the upper gripping dog 166 to the pilot wheel 100a. In Fig. 17 the parts are shown at a later stage after the tensioning device 170 has moved upwardly to draw the strap taut about the box and after the lower gripping dog 171 has moved inwardly to grip the supply portion of the strap against the plate 148. Following the arrival of the parts at the condition shown in Fig. 17, the sealing device 165 moves inwardly, as shown in Fig. 18, to cause the supply portion of the strap to be cut off beneath the upper gripping dog 166 and to cause an interlocking joint to be formed by applying a seal to the overlapping strap ends and then deforming the seal and the strap ends in the manner previously referred to.

Following the completion of the joint and the wrapping of the box, the upper gripping dog 166, the sealing device 165 and the lower gripping dog 171 are withdrawn from the plate 148, as shown in Fig. 19, and two ejecting members 172 are operated to release the seal and the bound strap from the gripping dogs and the sealing device. In Fig. 20 the upper gripping dog 166, the sealing device 165 and the lower gripping dog 171 remain in their retracted positions, as in Fig. 19, but the ejecting devices 172 are now retracted and the tensioning device 170 is moving downwardly to move the strap 78 to a position where its free end may again be engaged by the gripping dog 166. In Fig. 21 the downward movement of the tensioning device 170 has been completed and the free end of the strap 78 extends below the path of movement of the upper gripping dog 166 in readiness to be gripped when this gripping dog is again actuated as shown in Fig. 22. The upper gripping dog 166 is arranged to grip the free end of the strap and hold it against the plate 148, slightly before the tensioning device 170 reaches the limit of its downward movement with the result that a slight loop 78a is formed in the strap as shown in Fig. 22A.

The slack in the strap permits the tensioning device 170 to release itself readily from the strap and this action takes place promptly after the upper gripping dog 166 has gripped the strap, whereupon the parts of the tensioning device separate from the strap and move laterally to the positions shown in Fig. 23. The parts are then in the same relative positions that they occupied at the beginning of the sequence of operations, illustrated in Fig. 13, and the parts are in readiness for the wrapping of the strap about another box 77 which is shown by dotted lines in the wrapping position in Fig. 23.

The various operations which are performed during the wrapping of the package and the manipulation of the binding strap to form a joint and prepare for succeeding automatic operations are controlled by a system which is in part electrical, in part hydraulic, and in part mechanical. The mechanical portion of the system includes a vertical cam shaft 175, shown particularly in Figs. 1, 24, 27, 29, 30, 31, 35, 36, 37, 38 and 39. As shown in Fig. 1, this shaft extends vertically through a cam housing 176 and, as shown in Fig. 27, it is journaled in bearings 177 which are mounted in frame members 178 and 179 constituting the upper and lower walls respectively of the cam housing. The shaft 175 has secured thereon a series of cams 180, 181, 182, 183, and 184 which are spaced apart and from the bearing members 177 by spacing sleeves 185, 186, 187, 188, 189, 190 and 191. At its upper end the shaft 175 is threaded and is engaged by a washer 192 and a nut 193. Similarly, at the lower end the shaft 175 is threaded and is engaged by a washer 194 which seats against the hub of the cam 184 and this washer is engaged on its under side by a nut 195 having a threaded engagement with the shaft.

The spacing sleeve 191 is fixed on the shaft 175 and has rotatably mounted thereon beneath the spacing washer 190 a spur gear 197 which is provided on its under side with clutch teeth 197a adapted to be engaged by clutch teeth 198a formed on a clutch member 198 having a splined engagement with the shaft 175. This clutch member 198 is normally moved in an upward direction against the lower end of the gear 197 by means of a coil spring 199 which abuts against the cam 184 and against an annular shoulder formed upon the clutch member.

The spur gear 197 is adapted to be actuated by a rack bar 200 which is mounted to slide beneath a guide plate 201 carried by the lower wall 179 of the cam housing, as shown particularly in Fig. 24. The rack bar is secured at one end to a piston rod 202 which extends into a cylinder 203 adapted to be actuated by fluid pressure acting upon a piston secured to the piston rod. When the piston rod 202 is actuated to move toward the right as viewed in Figs. 1 and 29, the clutch teeth 198a engaging the teeth 197a, cause the gear 197 to rotate the shaft 175 through the clutch member 198. The clutch teeth are inclined in one direction so that when the piston in the cylinder 203 is retracted, the clutch teeth slide over each other and the clutch member 198 moves downwardly against the compression of the spring 199 so that the shaft 175 remains stationary during that reverse movement of the rack bar. At the proper times, the hydraulic system hereinafter described admits fluid under pressure to the cylinder 203 in order to actuate the rack bar 200 and the cam shaft 175.

As shown particularly in Fig. 24, means are provided for indexing the cam shaft 175 so that it always starts from the same position at the beginning of each operating cycle and stops in that position at the end of the cycle. An L-shaped lever 205 is pivoted on a pin 206 mounted on the rack bar guide 201. One arm 205a of this lever is inclined laterally away from the shaft 175 and the other arm 205b of this lever terminates in a tooth 205c which is adapted to enter a notch 198b formed in the side of the clutch member 198. This tooth is normally moved toward engagement with the notch 198b by a coil spring 207 which is fixed at one end to an intermediate part of the arm 205b of the lever and at the other end to a pin 208 secured on the rack bar guide 201. A bar 210 having a transversely extending lug 210a at its end is secured to the side of the rack bar 200 by a screw 211 and two pins 212 and, when the rack bar is moved toward the left, as viewed in Fig. 24, the projection 210a is adapted to engage a pin 214 projecting laterally from the arm 205b of the lever 205. This movement releases the tooth 205c from the notch 198b by moving the lever to the position shown by dotted lines in Fig. 24 so that the clutch member 198 is then free to rotate under the influence of the gear 197 as soon as the rack bar 200 is again moved toward the right as viewed in that figure. The movement of the rack bar toward the right causes the projection 210a to release the pin 214 but, before the tooth 205c can again engage the notch 198b in the clutch member, the clutch member will have started its rotation so that the tooth then rides on the cylindrical surface of the clutch member as the rotation of the cam shaft 175 continues. When the shaft has completed a single revolution, the tooth 205c again drops into the notch 198b and brings the shaft 175 to rest in its original starting position. The arm 205a of the lever 205 may be manually engaged for releasing the clutch member 198 from the lever whenever it is desirable to effect a manual rotation of the cam shaft 175 for the purpose of examining the parts which are associated therewith.

The upper gripping dog 166, which holds the free end of the strap against the plate 148 throughout the wrapping and sealing operation, is shown particularly with its operating mechanism in Figs. 29, 30 and 31 where it is illustrated as being actuated by the cam 181 on the cam shaft 175. The gripping dog 166 has a hooked extremity 166a which engages the strap 78 and holds it against the strap rest plate 148 when the parts of the actuating mechanism are in the relative positions shown in Fig. 30. The gripping dog 166 is pivoted at an intermediate point by a pin 215 to a link 217 which in turn is pivoted by a pin 218 upon the top wall 178 of the cam housing 176. At the right of the pivot 215 as viewed in Fig. 30, the gripping dog lever 166 extends transversely and is pivoted at 219 on a lever 220 which is pivoted on a pin 221 mounted in the wall 178 of the housing. Another lever 222 is pivoted on the pin 221 and carries a pin 223 on which is mounted a roller 224 engaged by the peripheral surface of the cam 181. The arms 220a and 222a of the levers 220 and 222 are connected by a bolt 225 and a coil spring 226 is mounted on this bolt between the two lever arms and tends to hold the levers apart. The compression of this spring may be varied by adjusting the nut on the end of the bolt. A coil spring 227 extends between the free extremity of the lever arm 222a and a stud 228 which is adjustably mounted in an extension 229 of the housing 176. The spring 226 maintains the roller 224 in contact with the peripheral surface of the cam 181 and when the cam has rotated in the direction of the arrow 230 to the position shown in Fig. 31, the roller 224 engages the depression of the cam 181 and the spring 226 then actuates the levers 220 and 222 to cause the gripping dog 166 to be retracted from its gripping position. When the cam 181 has rotated to the position where its convex peripheral surface engages the roller 124 the parts are restored to the position shown in Fig. 30 and remain in that position during a substantial portion of the rotation of the cam 181 during which the radius of the cam surface in contact with the roller 24 remains unchanged. When the gripping dog 166 is moved to its gripping position, the spring 226 is adapted to be compressed to cause the dog to grip the strap with a resilient pressure and the spring 226 may yield to prevent breakage of the gripping dog or its connections in case of variations on the thickness of the strap and the like.

The lower gripping dog 171 which is represented diagrammatically in Figs. 13 to 23, inclusive, has the form shown in Fig. 32, being provided with a hooked extremity 171a which is adapted to coact with the supply portion of the strap 78 to hold it against the rest plate 148 after the box has been wrapped and the strap is being cut off and sealed as shown in Figs. 17 and 18. The cam 183 mounted beneath the cam 181 is adapted to actuate the lower gripping dog 171 through mechanism which is identical with that shown in Fig. 30 for operating the upper gripping dog 166, the only differences being in the shape of the gripping dog 171 and in the shape of the cam 183. The configuration of the cam 183 coincides with the external configuration of the cam 181 except for the part of the cam 183a which is illustrated by dotted lines in Fig. 30, from which it will be apparent that the mechanism for holding the gripping dog 171 in its gripping position is adapted to retain it in that position for a comparatively limited period corresponding to the time required for cutting off the strip and sealing the joint after the strap has been drawn taut. The cam 183 moves with the cam shaft 175 and effects this gripping operation in the proper timed relation to the actuation of the tensioning mechanism and the sealing device 165.

The cams 181 and 183 also actuate the ejecting members 172, shown particularly in Figs. 19, 27, 29 and 36, which operate to thrust the bound strap edgewise away from the rest plate 148 after the wrapping of the box and the sealing of the strap has been completed. For this purpose, a roller 235 is mounted to revolve on a pin secured in each of the cams 181 and 183, as shown in Fig. 27, and these rollers are adapted to operate levers 236 which are pivoted at 237 on the housing 176, as shown in Fig. 36. The upper arm of each lever is adapted to be engaged by one of the rollers 235 and the lower end of each lever is bifurcated to form a slot 236a having engagement with a pin 238 secured on the side of the ejector 172. These ejectors are mounted to reciprocate on a wall of the housing 176 and are provided with slots 172a engaged by guide pins 239 which limit their travel in each direction. The ejectors 172 are normally held in a retracted position by coil springs 240 which are secured at one end to the ejectors and at the other end to fixed pins 241 carried by the housing 176. When the cams 181 and 183 reach positions where the rollers 235 simultaneously engage the levers 236, in the manner shown in Fig. 36, the extremities 172b of the ejectors are thrust outwardly, as shown in Fig. 19, to project the strap away from the gripping and sealing devices.

The strap sealing device 165, which is represented diagrammatically in Figs. 13 to 23, inclusive, is shown more specifically with its operating mechanism in Figs. 27, 28, 29, 35, 35B, 35C, 37 and 38. This sealing device and its operating mechanism are actuated by the cams 180 and 182 which are mounted upon the cam shaft 175 and the upper cam 180 is arranged to coact with a roller 245 which is mounted at the end of a crank arm 246 secured upon a countershaft 247 shown particularly in Fig. 28. This shaft is mounted in bearings 249 fixed in the walls 178 and 179 of the cam housing 176. Within this housing another crank arm 250 is secured on the countershaft 247 and this crank arm is pivotally connected at its outer end by a pin 251 to the sealing device 165 in the manner shown particularly in Figs. 37 and 38. The pin 251 has pivotally mounted thereon an arm 252 which has secured to the opposite sides thereof the side plates 253 of the sealing device which are spaced apart to receive between them a link 255 which is pivoted to the side plates by a pin 256 and which is supported by a pin 257 on the side wall of the housing 176. The pin 251 also forms a pivotal support for an actuating lever 260 which is made up of two plates spaced apart and having rotatably mounted between them on a pin 261 a roller 263 which is adapted to be engaged by the cam 182. The spaced plates of the actuating lever 260 are connected together on their upper sides by a top plate 264 and a coil spring 265 is mounted between this plate 264 and the upper edges of the side plates 253 of the sealing device. This spring 265 is engaged at its ends by two pins 266 and 267 which are mounted on the members 253 and 260, respectively, and it acts normally to separate the actuating lever 260 from the plates of the sealing device, as shown in Fig. 38. When the crank arm 250 is rotated by the shaft 247 in response to the rotation of the cam 180, the sealing device is thrust toward the left from the position shown in Fig. 38 to the operating position shown in Fig. 37.

The side plates 253 of the sealing device have mounted between them the pivoted sealing jaws 270 of that device and the upper ends of these jaws are pivotally connected by links 271 with the end of an operating member 272 attached to the free end of the actuating lever 260. Promptly after the sealing device has been moved from the position shown in Fig. 38 to the operative position shown in Fig. 37, the cam 182 engages the roller 263 and actuates the lever 260 with the result that the spring 265 is compressed and the operating member 272 is actuated to spread the links 271 and thereby close the jaws 270 of the sealing device upon the metal seal mounted between the jaws with the result that the walls of the seal are bent around the overlapping strap ends and the seal and strap ends are then deformed to provide the type of interlocking joint which is shown particularly in Fig. 34. When the joint has been formed and the roller 263 has been released by the cam 182, the spring 265 separates the actuating lever 260 from the side plates of the sealing device and the sealing jaws 270 are restored to their normal positions. Also, when the sealing mechanism is released by the cam 182, the sealing device is restored to the inactive position shown in Fig. 38 by a coil spring 275 shown in Fig. 35, which is connected at one end to a short arm 276 projecting from the hub of the crank arm 246 on the side thereof opposite the roller 245, and which is connected at its other end to a pin 277 secured in a bracket 278 carried by the cam housing 176. The spring 275 thus normally tends to retract the sealing mechanism to the inoperative position shown in Fig. 38 and it is moved from that position to the operative position shown in Fig. 37 only by the action of the crank arm 250 in response to the action of the cam 180 on the crank arm 246. For the purpose of controlling the freedom of rotation of the cam 180 during the time that the sealing mechanism is held in its operative position by that portion of the cam 180 which has the larger radius, a brake member 280 is pivoted on a pin 281 attached to the housing 176 and arranged to bear upon the peripheral surface of the portion of the cam having the large radius shown in Fig. 35. This brake member 280 is pivotally connected to a threaded pin 282 which engages an aperture in a bracket 283 fixed on the wall of the housing 176 and a coil spring 284 is mounted on this pin between the bracket and the side of the brake member 280. A nut 285 engaging the threaded end of the pin 282 may be adjusted to regulate the compression of the spring 284 and the time when it engages the cam. The extreme retracted position of the sealing device, shown in Fig. 38, may be regulated by a stop screw 287 which threadedly engages the wall of the housing 176 and which bears against the outer end of the crank arm 250, being secured in adjusted position by a lock nut 288. There is also mounted upon the shaft 247 an arm 289 having adjustably mounted in the free end thereof a stop screw 290 which is adapted to engage the operating member 291a of an electric switch 291 when the sealing device is fully retracted, as shown in Fig. 38, thereby preparing the electric circuit for a new cycle of operations as hereinafter more fully described.

The portion of the sealing device 165 which operates upon the seal 160 (Fig. 33) and the enclosed strap ends to form a joint 159 of the form shown in Fig. 34 is shown in Figs. 37 and 38 and also in Figs. 35A, 35B and 35C. The jaws 270 are pivoted at 295 between the side plates 253 and their upper ends (as viewed in Fig. 38) are pivotally connected at 296 to the links 271 so that when the operating member 272 is moved downwardly by the actuating lever 260, the upper ends of the jaws are spread apart and the lower ends of the jaw members swing toward each other to bend the side walls 160a of the seal under the strap ends and then to shear the edges of the strap and seal against stationary dies 297 to form the deformations 159 as shown in Fig. 34. As shown in Fig. 35C each jaw is made up of a plurality of jaw plates 270a which have the stationary die plates 297 mounted between them and at their sides between the pivot pins 295 so that the projections 270b at the lower ends of the jaws close upon each other to bend the side walls 160b of the seal beneath the strap ends and then shear the edges of the strap and seal in cooperation with the stationary die plates and cause the parts 159a to be deflected to provide an interlocking joint.

The seals 160 are fed to a position between the jaws 270 while the sealing device 165 is in its elevated and retracted position as shown in Fig. 38 and a seal is supported between the jaws, while they are lowered to the sealing position shown in Fig. 37, by metal clips 300 carried by the pins 295 and having parts extending below the side plates 253 to terminate in opposite inwardly directed flanges 300a upon which the edges of the side walls 160b of a seal are adapted to rest. The seals are fed endwise to a position on the flanges 300a and when the jaws 270 are operated the side walls of the seal move off of these flanges and are bent to enclose the strap ends.

The seal is retained in position on the flanges 300a, prior to its deformation by the jaws 270, by means of bridge member 302 (Fig. 35B) which is mounted between the jaws and slidably mounted on a pin 303 which is carried by a member 304 having trunnions 304a which are seated in apertures 297a formed in the stationary die plates. A coil spring 305 mounted on the pin 303 tends to force the bridge member into engagement with the top wall 160a of the seal and a projection 302a is adapted to enter the centrally located aperture 160c in the top wall of the seal so that the seal is properly positioned endwise between the jaws. This projection is tapered in one direction so that the seal will slide under it as the seal is fed to a position between the jaws and when the seal reaches the right position the projection snaps into engagement with the aperture in the seal.

Reference will now be made to the means for supplying the seals and for feeding the seals to the jaws of the sealing device 165. The seals 160 are stacked in nested relationship in a magazine 310 (Figs. 3 and 35) which is carried by the frame 80 and by a block 311 mounted in the housing 176 and arranged in an inclined position so that the seals may be moved from the magazine in proper positions to be passed endwise into engagement with the jaws when they are in the retracted position shown in Fig. 38. A plunger 312 is mounted in the magazine to engage the back wall of the endmost seal of the stack and this plunger is connected through a longitudinal slot in the magazine with a flexible cord 313 which extends over a pulley 314 and is connected to a suspended weight 315 (Figs. 1 and 2) so that the plunger is urged against the seals to force them toward the sealing device.

The seal feeding mechanism for moving the seals from the magazine 310 to the jaws 270 is shown particularly in Figs. 35, 35A and 39 and comprises a cam 317 secured on the wrapping ring 99 and positioned to actuate a compound lever 318 which is pivoted at 319 on a stationary member carried by the housing 176. The lever 318 is made up of two members 318a and 318b each pivoted on the pin 319 and each provided with a projecting arm 318c attached to a coil spring 320. This spring normally maintains the parts 318a and 318b in alignment with their abutting shoulders 318d in contact as shown in Fig. 39. The part 318a has a finger 318e which lies in the path of travel of the cam 317. The free end of the part 318b is provided with a slot 318f engaged by a pin 321 on the seal ejector 322. This seal ejector has an arm 322a engaged by the pin 321 and the body portion thereof is in the form of a flat bar arranged to slide in a channel between two guide blocks 323 (Fig. 35A). The endmost seal in the magazine engages these guide blocks with the top or back wall 160a of the seal engaging the surfaces 323a of the blocks and with the diverging side walls 160b engaging the inclined surfaces 323b of the blocks. The seal ejector 322 has a shoulder which projects beyond the surfaces 323a sufficiently to engage the top wall of the endmost seal in the stack without contacting the next adjacent seal so that when the lever 318 is actuated by the cam 317, the seal 160 is moved on the guide members 323 and projected into the space between the jaws of the sealing device 165 where it is supported by the flanges 300a of the clips 300. The two parts 318a and 318b of the lever 318 move as a unit in effecting this feeding movement but the part 318a is adapted, upon further movement of the cam 317, to pivot independently of the part 318b by extending the spring 320, thus permitting the cam 317 to pass by. The two parts 318a and 318b then return to their normal positions and, when the feeding of the seal is completed, the feeding mechanism including the ejector 322 are returned to their normal positions by a coil spring 325 (Fig. 35) which is mounted on the pin 319 with one arm thereof fixed in the block 311 and the other arm thereof attached to the part 318b of the lever. The parts are then in readiness for the next seal feeding operation.

In addition to performing the function of applying a seal and forming an interlocking joint between the overlapping strap ends after the strap has been drawn taut, the sealing device 165 also serves to cut off the strap after it has been gripped by the lower gripping dog 171 and during the process of moving from the retracted position shown in Figs. 17 and 38 to the operating positions shown in Figs. 18 and 37. The shearing is effected by the coaction of one of the side plates 253 of the sealing device with the tip portion 166a of the upper gripping dog 166. This tip or head is enlarged laterally as shown in Fig. 39 so that the head or tip 166a has a lateral edge lying in proximity to the path of travel of the edge of the side plate 253 of the sealing device so that when the sealing device moves downwardly from the position shown in Fig. 38 to the position shown in Fig. 37, the side plate cooperates with the head 166a of the gripping device to shear off the supply portion of the strap leading from the tensioning device 170. To accommodate the enlarged width of the head portion 166a of the gripping dog 166 as compared with the body portion thereof, while permitting movement of the gripping dog from the operating position shown in Fig. 30 to the retracted position shown in Fig. 31, the frame member 178 is cut away as shown at 178a.

The tensioning device 170 by which the strap is drawn taut around the box after it has been wrapped around it and is being held at its free end by the upper gripping dog 166, is shown particularly in Figs. 41 to 47, inclusive, where it is illustrated as being mounted upon the plate 155 (Fig. 1) which extends downwardly from the upper part of the frame 80 in an inclined direction and terminates adjacent the position occupied by the upright edge of the box 77 when the box is in proper position on the table to be wrapped. The tensioning device 170 has its gripping dogs 330 and 331 mounted adjacent the edge of the plate 155, as shown in Figs. 41 and 44, so that they are in proximity to the strap 78 in the position it occupies when passing upwardly from the upper gripping dog 166 to the pilot wheel 100a.

The gripping dogs 330 and 331 are fixed on two shafts 332 and 333, respectively, which are journaled in bearings in a block 334 which is secured to an L-shaped plate 335 mounted upon the plate 155 by means of two studs 336 and 337 which pass through apertures in the plate 335 and engage slots 155a and 155b, respectively, formed in the plate 155. The ends of these studs threadedly engage a connecting bar 338 which is mounted on the opposite side of the plate 155 as shown in Figs. 42 and 45. The two slots 155a and 155b have end portions 155c which are inclined away from the edge of the plate 155 adjacent the strap 78 so that when the plate 335 is moved upwardly on the plate 155 from the position shown in Fig. 41, the studs 336 and 337 first pass through the inclined portions 155c of the slots so that the gripping dogs 330 and 331 are then projected outwardly in a position to engage the strap 78. The gripping dogs are normally moved to gripping position by a coil spring 340 which has its ends mounted in recesses formed in the opposed faces of the gripping dogs, as shown in Figs. 42 and 45, so that this spring thereby tends to force the gripping dogs to a position where they will grip the strap in contact with a gripping plate 341 carried by an extension of the plate 335.

The stud 336 which engages the upper slot 155a also has a pivotal connection with an L-shaped link 343 which extends upwardly and has a pivotal connection with a piston rod 344 extending into a cylinder 345, as shown in Fig. 1. When fluid under pressure is admitted to the cylinder 345, the piston connected to the piston rod 344 is actuated to reciprocate the link 343 and thereby move the plate 335 upon which the gripping dogs are mounted so that these dogs may be thereby moved into a position where they may grip the strap and may be actuated either to draw the strap taut or to feed it in a reverse direction so that its free end is in position for a succeeding operation. For this purpose, the fluid pressure is capable of being applied to either end of the cylinder 345 so that the plate 335 may be either raised or lowered as viewed in Figs. 41 and 44.

The movement of the gripping dogs 330 and 331 into and out of gripping position is controlled by two levers 347 which are secured on the ends of the shafts 332 and 333 at the ends thereof opposite the gripping dogs, as shown in Figs. 41 and 43. These levers 347 are adapted to be actuated by a plunger 348 which is mounted to reciprocate in a tubular bore 349a formed in a block 349 secured to the plate 155. This plunger 349 has a rounded inner extremity 348a which is adapted to be engaged by a wedge-shaped cam 350 mounted upon a bar 351. This bar is mounted for a sliding movement on the plate 155 and its movements respond to but lag behind the movements of the plate 335 so that the actuation of the levers 347 by the plunger 348 is effected in timed relation to the movements of the plate 335 in such a manner that the strap is gripped and released at the proper times during the cycle.

After the gripping dogs 330 and 331 have been moved out of gripping position by the levers 347 through the actuation of the plunger 348 by the cam 350, the plunger 348 is adapted to be held in that position by means of a latch device which is shown particularly in Figs. 41, 46 and 47. This latch device comprises a latch member 353 mounted to reciprocate in a transverse extension 349b of the block in which the plunger 348 is mounted and the inner end of this latch member normally rides upon the cylindrical surface 348c of the plunger, as shown in Fig. 46. A collar 354 is mounted on the latch member 353 and a coil spring 355 is mounted around the latch member on the cylindrical passage in which the collar 354 slides so that this spring normally moves the latch member toward the plunger 348 and, when the plunger has been retracted by the cam 350, the extremity of the latch member 353 is adapted to engage the annular groove 348b of the plunger to hold the plunger in its retracted position with the gripping dogs 331 and 332 moved out of their gripping position as shown in Fig. 42. After the gripping dogs and their operating levers 347 have been moved along with the plunger 348 away from the cam 350, the gripping dogs are retained in their retracted position by the latch member 353 until the head 353a of this latch member engages a cam 355 which is mounted on a plate 356 adapted to be secured in adjusted position on a plate 357 secured to the plate 155, through the agency of clamping screws 358 which engage elongated slots 356a formed in the cam plate. Thus, assuming that the cam 350 and its supporting bar 351 remain stationary in the position shown in Fig. 43, an upward movement of the plate 335 will carry the plunger 348 away from the cam 350 and when the head 353a of the latch member engages the cam 355, the plunger 348 will be released and the gripping dogs 330 and 331 will be permitted to move to gripping positions under the influence of the spring 340.

As shown particularly in Figs. 41 and 41A, the bar 351 is mounted on the plate 355 and guided by two pins 360 which engage slots 155d formed in the plate 155 and the bar 351 is actuated to move the pins 360 longitudinally of these slots by means of a block 363 which is located in a rectangular aperture 335a formed in the lateral extension of the plate 335. The block 363 is provided on one side with two projecting pins 364 which engage a slot 351a formed in the bar 351. Motion is imparted to the bar 351 by the movement of the plate 335 in response to the actuation of the fluid pressure cylinder 345 but the bar 351 is not actuated until the plate 335 has moved sufficiently to cause one of the pins 364 to engage one end of the slot 351a, whereupon the bar 351 is moved endwise to cause a corresponding movement of the cam 350 by which the plunger 348 is actuated.

To insure that the bar 351 remains in a stationary position over the plate 155 until one of the pins 364 engages one end of the slot 351a, a brake is provided for retarding the movement of the bar 351. This brake comprises an arm 365 provided with a slot 365a which is engaged by a pin 366. The arm 365 is secured upon a disk 367 which is mounted to rotate about a pin 368 secured to the plate 165. A brake shoe 369 engages the peripheral surface of the brake disk 367 and is held in contact therewith by a spring 370 or the like which is mounted upon an adjusting screw 371 mounted in the wall of the cylinder 372 in which the brake shoe 369 is mounted to reciprocate. The adjusting screw 371 engages a recess in the end of the brake shoe 369 and may be adjusted to regulate the compression of the parts 370 and thereby adjust the pressure with which the brake shoe bears upon the brake disk 367. In this way, the bar 351 is held in stationary position on the plate 155 until it is positively actuated by the block 363 mounted at the aperture 335a of the plate 335.

In the operation of the tensioning device the parts are in the relative positions shown in Figs. 41, 42 and 43 while the strap is being wrapped around the package and, at this time, the gripping dogs of the tensioning device 170 are in the retracted position away from the strap which is represented diagrammatically in Figs. 13 and 14. When the wrapping has been completed and the strap has been wrapped entirely around the package, fluid is admitted under pressure to the lower end of the cylinder 345 (Fig. 1) and this initiates the operation of the tensioning device by causing the plate 335 to move upwardly on the plate 155 under the influence of the link 343 which is connected through the piston rod 344 to the piston within the cylinder. At the commencement of this movement of the plate 335, the gripping dogs 330 and 331 are in the retracted positions shown in Fig. 42, being held in that position by the plunger 348 engaging the levers 347 as shown in Fig. 43. At that time the plunger 348 is held in the position there shown by the cam 350 and also by the latch 353 which then engages the annular groove 348b of the plunger. The initial movement of the plate 335 causes the studs 336 and 337 to move along the inclined portions 155c of the slots 155a and 155b in the plate 155 with the result that the plate 335 is projected outwardly from the position shown in Fig. 41 to the position shown in Fig. 44 so that the gripping dogs 330 and 331 will then overlie the strap 78 and the plate 341 will occupy a position beneath the strap. The studs 336 and 337 will then move upwardly along the vertical portions of the slots 155a and 155b and, at an early stage in this movement, the plunger 348, which will have passed out of engagement with the still stationary cam 350, will be released by the latch 353 through the engagement of the head 353a of that latch with the cam 355. The gripping dogs 330 and 331 are thereby released and grip the strap 78 against the plate 341 so that, as the upward movement of the gripping dogs continues with the movement of the plate 335, the strap 78 is drawn taut. The condition of the tensioning device when the gripping dogs have passed into engagement with the strap is shown in Fig. 16 and the condition when the strap has been drawn taut is indicated in Fig. 17. At that time the lower gripping dog 171 will have been actuated to grip the supply end of the strap beneath the stationary gripping dog 166, as shown in Fig. 17. By that time, the upward movement of the piston in the cylinder 345 will have been arrested and the plate 335 is brought to rest.

During the early part of the upward movement of the plate 335 this plate slides over the bar 351 which remains stationary under the influence of the brake shoe 369 acting upon the disk 367 but, before the upper limit of movement of the plate 335 is reached, one of the pins 364 on the block 363 will engage the end 351b of the slot 351a in the bar so that the bar is then moved longitudinally while its pins 360 travel in the slots 155d in the plate 155.

When the strap has been drawn taut by the tensioning device and the supply portion thereof has been gripped by the lower gripping dog 171, as shown in Fig. 17, the sealing device 165 is brought into action, as shown in Fig. 18, to cut off the supply end of the strap and to form an interlocking joint between the overlapping strap ends. Immediately thereafter, the upper gripping dog 166, the sealing device 165, and the lower gripping dog 171 are retracted as shown in Fig. 19 and the ejectors 172 are actuated to move the strap away from the plate 148 and fluid under pressure is admitted to the upper end of the cylinder 345 to initiate the downward movement of the tensioning device 170, as shown in Fig. 19. At the beginning of this downward movement of the plate 335, the bar 351 remains stationary, as before, under the influence of the brake shoe 369 and the disk 367. The purpose of this downward movement of the tensioning device 170 is to project the free end of the strap to a position where it may be operated upon by the upper gripping dog and the sealing device in the next cycle of operations of the machine and this continues, as shown in Figs. 20 and 21, until the lower end of the strap occupies the desired position slightly below the path of travel of the sealing device 165. At this point, the strap is again gripped by the upper gripping dog 166, as shown in Fig. 22, but the downward movement of the tensioning device 170 continues thereafter, for a limited period, thus causing a buckle 78a in the strap as shown in Fig. 22A. When the tensioning device 170 has reached the position shown in Fig. 22A, the plunger 348 rides up on the cam 350 and thus releases the gripping dogs 330 and 331 from the strap, as shown in Fig. 42. When this condition is established the plunger 348 is again locked in position by the latch member 353 so that the gripping dogs 330 and 331 are retained in their retracted positions. The movement of the plate 335 continues, however, and at this time the bar 351 moves with the plate 335 by reason of the fact that one of the pins 364 in the block 363 has then engaged the lower end 351c of the slot in this bar. In the final stages of this movement of the plate 335 the studs 336 and 337 again travel in the inclined portions 155c of the slots 155a and 155b so that the plate 335, the gripping dogs 330 and 331 and the plate 341 are moved inwardly from the positions shown in Fig. 44 to the positions shown in Fig. 41. The parts are then in readiness for a new cycle of operations, as represented diagrammatically in Fig. 23.

In order to guide the strap 78 so that it will be in proper position to be gripped by the tensioning device 170 when the gripping dogs of that device are moved from the position shown in Fig. 41 to the position shown in Fig. 44, a guide 375 is mounted to slide in a guideway 311a formed in the lower part of the block 311, as shown in Fig. 35. This guide 375 has an enlarged head 375a which is adapted to engage the strap at a point somewhat below the location of the gripping dogs 330 and 331, thereby positioning the strap so that it may be properly engaged by the gripping dogs. This guide member 375 has a collar 376 mounted thereon and a spring 377 is mounted on the guide member between this collar and a block 378 fixed on the housing 176 so that the guide member is normally moved to the operative position shown in Fig. 35 by the action of this spring. Its movement toward the operative position is limited by a lug 379 mounted on the stop member and engaging the side of an actuating lever 380, shown in Figs. 35, 40, 41 and 44. This lever is pivoted at 381 on the plate 155 and it is provided with a transversely extending arm 380a adapted to be engaged by the lower rounded corner 335a of the plate 335 when the plate 335 is in the lower position shown in Fig. 41. The action of the portion 335a on the lever of the plate 331 is to move it from the position shown in Fig. 44 to the position shown in Fig. 41 which operates to retract the guide 375 against the compression of the spring 377. When the plate 335 moves upwardly the lever 380 is released and the guide 375 is moved by the spring 377 to its guiding position.

In addition to the guiding means just described, two other guides are provided for supporting and directing the strap 78 in the region between the sealing device and the pilot wheel 100a, as shown in Figs. 2, 3, 5 and 6. For this purpose, two of the blocks 85a which support the rollers for guiding the reel 90 have secured thereto other blocks 384 (see Fig. 3) which have secured thereto a bar 385 arranged to extend across a part of the central opening 75a of the machine structure, as illustrated in Fig. 2. This bar 385 has secured thereto a bracket 386 which extends inwardly toward the rear of the machine, as shown in Fig. 5, and is provided at its inner end with two sheet metal fingers 387 which are adapted to bear against the strap 78. Adjacent to the bracket 386, another bracket 388 is secured on the bar 385 to extend inwardly therefrom and this bracket has on the inner end thereof a guide member 390 which is mounted to pivot on a pin 391 fixed in the bracket. The end 390a of this guide bears against the side of the strap as shown in Fig. 5 and it is normally moved to the guiding position by a coil spring 392 which is secured to the arm 390b of the guide member and to a pin 393 fixed in the bracket 388. The arm 390b bears against a stop pin 394 mounted in this bracket and the guide member 390 is adapted to pivot to the position shown by dotted lines in Fig. 6 to allow the passage of the strap.

The hydraulic system for operating various parts of the apparatus is shown in Fig. 48 which illustrates diagrammatically the hydraulic motor 95 for rotating the strap supply reel 90, the hydraulic motor 104 for rotating the wrapping ring 99, the cylinder 345 for operating the tensioning device 170, the cylinder 203 for rotating the cam shaft 175 and, also, a cylinder 400 which is secured to the frame 80 (Fig. 1) and has its piston connected to a piston rod 401 extending downwardly and pivotally connected at 402 to a latch lever 403. This latch lever is pivoted at an intermediate point on a link 404 which is pivotally mounted at 405 on the frame 80. The latch lever 403 has a projecting extremity 403a which is adapted to be moved by the cylinder 400 into the path of travel of a stop 406 mounted on the wrapping ring 99, for a purpose to be hereinafter described. In Fig. 48 there are also diagrammatically shown other valves, hydraulic lines and other parts of the hydraulic system which are not shown elsewhere in the drawings.

As shown in Fig. 48, an electric motor 410 drives a hydraulic pump 411 which pumps hydraulic fluid from a fluid reservoir 412 through the pipe 413 and discharges it through a pipe 414 to a pressure relief valve 415 from which the fluid flows through a pipe 416 to the common high pressure supply line 418. A pressure gauge 419 is connected by a pipe 420 to the line 416 and a manually operated valve 421 is connected in the line 420. The high pressure supply line 418 is connected to five branch supply lines 422, 423, 424, 425 and 426.

An accumulator 428 of the conventional expanding bag type is connected by a pipe 429 to the supply line 418 through a four-way connection 429 and a manually operated valve 430 is connected in this line 429. The purpose of this accumulator is to equalize the load on the pump 410 as the demand of the machine varies. The pressure relief valve 415 is set for the maximum pressure desired in the hydraulic system and since the pressure in the pump line 414 normally tends to exceed this limit, the fluid overflows this valve and the excess returns to the reservoir through the line 431. As the pressure in the system falls off below the desired limit, the valve 415 again permits the flow of fluid to the system. In the event that the pump 410 is shut down, the valve 430 is closed to prevent the fluid in the accumulator 429 from draining into the system.

In the branch circuit for operating the reel drive motor 95, the pipe 425 connects to the port 433a of a four-way solenoid operated valve 433. The port 433b of this valve is connected through a pipe 434 and a flow control valve 435 to the port 95a of the reel motor. A pipe 436 leads from the port 95b of the reel motor to the port 433c of the reel motor and a pipe 437 leads from the port 433d to the common low pressure return line 438. A pipe 439 leads from the line 438 back to the reservoir 412.

In the branch hydraulic circuit for operating the cam drive cylinder 203, the pipe 426 leads from the high pressure supply line 418 to the port 440a of a four way solenoid operated valve 440 and the pipe 441 leads from the port 440b of this valve to the port 203a of the cam drive cylinder. A flow control valve 442 is connected in the line 441 and a by-pass pipe 443 connected around this valve 442 has connected therein a check valve 444 adapted to permit flow only toward the cylinder. The port 203b of the cylinder is connected by a pipe 445 to the port 440c of the solenoid operated valve 440. A return flow pipe 446 leads from the port 440d of the valve 440 to the low pressure return line 438.

The wrapping ring motor 104 is supplied with hydraulic fluid by the branch pipe 423 which leads directly from the supply pipe 418 to the port 104a of the wrapping ring motor. The outlet port 104b of this motor is connected to a pipe 448 having connected therein a flow control valve 449 and leading to the return flow pipe 450 which is connected to the low pressure line 438. A by-pass pipe 451 is connected in the pipe 448 to extend around the valve 449 and this pipe 451 has connected therein a pressure relief valve 452 from which a pipe 453 extends to the port 455a of a two-way solenoid operated valve 455. A pipe 456 leads from the port 455b of this valve to the return line 450.

The cylinder 400 which actuates the wrapper ring stop is supplied with hydraulic fluid through the pipe 424 which leads from the supply line 418 to the port 458a of a four way solenoid operated valve 458. A pipe 459 connects the port 458b of this valve through a flow control valve 460 with the port 400a of the cylinder. The port 400b of the cylinder is connected by a pipe 461 to the port 458c of the valve 458 and the port 458d of this valve is connected by a pipe 462 to the return line 438.

The cylinder 345 which actuates the strap tensioning device 170 is supplied with hydraulic fluid through the pipe 422 which leads from the supply line 418 to the port 465a of a four way cam operated valve 465. A pipe 466 leads from the port 465b of this valve through a flow control valve 467 to the port 345a of the cylinder. A pipe 468 leads from the port 345b of this valve through a flow control valve 469 to the port 465c of the valve 465. A pipe 470 is connected to the pipe 468 to form a by-pass around the valve 469 and this by-pass has connected therein a flow control valve 471. The port 465d of the valve 465 is connected to the low pressure line 438 by a pipe 472.

The operation of the hydraulic system described above will be more fully explained in connection with the associated electric circuit which is diagrammatically illustrated in Fig. 49. As there shown, the motor 410 which drives the pump 411 is supplied with electric current from a 3-phase circuit comprising the line conductors 475, 476 and 477 which have connected therein the relay switches 478, 479 and 480, respectively. Two of these lines have overload fuses 481 connected therein.

The parts of the electric system other than the motor 410 are operated by one phase of the 3-phase system and for this purpose the line conductor 475 is connected to a supply line 482 and another line conductor 477 is connected by a conductor 483 to a line conductor 484 through a normally closed switch 485. The various elements of the electric system, with the exceptions referred to, are connected between the supply conductors 482 and 484. These elements will be described in connection with the description of their operation.

To start the pump motor 410, the spring return starting switch 487 is closed and this causes the relay solenoid 488 to energize and close the relay switches 478, 479, 480 and 489 as current passes from the point 490 to the point 491 through the conductor 492 which also has connected therein the thermal overload switches 493 and 492 and the pump stop switch 495. The switch 489 is a holding switch which maintains the circuit after the starting switch is released and until the stop switch 495 is opened. The switches 478, 479 and 480 maintain the circuit of the motor 410 until the switch 495 is opened.

When the pump 410 is running the closed switch 485 completes the circuit to the conductor 484 so that a circuit is then established through the conductor 496 between the points 497 and 498 and this energizes the relay solenoid 500, thereby closing the relay switches 501 and 502 which are connected in the line 503 between the points 504 and 505. This energizes the solenoid of the valve 440 by which the cam drive cylinder 203 is controlled, thereby connecting the port 440a to the port 440b and connecting the port 440c to the port 440d, thus admitting fluid under pressure from the line 418 to the cylinder 203 to cause the piston rod 202 and the rack bar 200 to remain extended in the positions they occupied at the end of the preceding cycle.

The starting switch 510 is then closed manually to energize the relay solenoid 511 connected in a line 512 extending between the point 513 on the supply conductor 482 and a point 514 on the conductor 496. The energization of the solenoid 511 closes the holding switch 515 to maintain the circuit of the solenoid 511 when the starting switch 510 is released and it also closes the switches 516 and 517 which are connected on the line 518 extending between the point 519 on the line 482 and the point 520 on the line 484. The starting switch 525 is then closed to complete the circuit of the solenoid operated valve 458 which controls the wrapper ring stop cylinder 400, thereby causing port 458a to be connected to port 458b and causing port 458c to be connected to port 458d. Fluid under pressure then flows from the high pressure line 418 to the port 400a of the cylinder 400, while low pressure fluid flows from the port 400b of the cylinder through the pipes 461 and 462 back to the low pressure line 438. This causes the piston rod 401 (Fig. 1) to be extended, thereby actuating the latch lever 403 to release the stop 406 so that the wrapping ring 99 is free to rotate. As the piston rod 401 extends, it strikes and closes the switch 526 which permits current to flow over the line 527 between the points 528 and 529 to energize the relay solenoid 530. A holding switch 531 is connected in a shunt circuit around the switch 526 and is actuated by the closing of the switch 526 to maintain the circuit of the solenoid 530 after the switch 526 is released. When the relay solenoid 530 is energized it closes the switches 532 and 533 connected in the line 534 between the points 535 and 536. This energizes the solenoid operated valve 455 to cause the port 455a to be connected to the port 455b. Fluid then flows from the high pressure line 418 through the pipe 423 to the wrapper ring drive motor 104 and low pressure fluid is returned through the pipe 448, flow control valve 449, and through the parallel branch pipe 451, pressure relief valve 452, pipe 453, port 455a, port 455b, and pipe 450, back to the low pressure return line 438. The wrapping ring 99 is thus rotated to wrap the strap around the box or package.

Almost immediately after the wrapping ring 99 starts rotating, a cam 538 mounted on the wrapping ring (Fig. 1) passes and opens a switch 539 connected between the points 498 and 514 in the line 496 (Fig. 49), thereby deenergizing the solenoids 500 and 511 and causing the switches 515, 516 and 517 to open. The opening of the switch 515 insures that the solenoid 511 will not be energized as soon as the cam 538 comes around and strikes it again. The opening of the switches 516 and 517, which deenergizes the solenoid valve 458, causes the piston rod 401 of the wrapper ring stop cylinder 400 to retract and thereby move the lever 403 (Fig. 1) to a position where it will engage the stop 406 and stop the rotation of the wrapping ring when its cycle is completed. When the solenoid operated valve 458 is deenergized, a spring actuated return causes the port 458a to connect to the port 458d and the port 458b to connect to the port 458d so that fluid under pressure then flows from the high pressure line 418 through the pipe 424, port 458a, port 458c and pipe 259 and into the cylinder 400 to retract the piston. The low pressure fluid flows from the port 400a, pipe 459, ports 458b and 458d and pipe 462 back to the low pressure line 438.

The deenergization of the solenoid 500 in response to the opening of the switch 539 causes the switches 501 and 502 to open and thereby deenergize the solenoid operated valve 440. A spring return in this valve causes the ports 440a and 440c to connect and the port 440b to connect with the port 440d so that fluid flows from the high pressure line 418 through the pipe 426 and pipe 445 to the port 203b of the cam drive cylinder 203, thereby retracting the piston rod 202 and the rack 200 without rotating the cam shaft 175 as the jaws 197a in the gear 197 slip over the clutch teeth 198a on the clutch member 198. At this time fluid flows from the low pressure port 203a of the cylinder 203 through the pipe 441, check valve 444 and flow control valve 442, ports 440b and 440d and pipe 446 to the low pressure line 438.

As the wrapping ring 99 continues its rotation, the cam 538 strikes and closes the switch 540 to permit current to pass between the points 541 and 542 over the line 543, thereby energizing the solenoid 544 which operates to close the holding switch 545 as well as the switches 546 and 547 which are connected in a line 548 between the points 549 and 550 in series with the solenoid operated valve 433 by which the reel driving motor 95 is controlled. The actuation of the solenoid valve 433 causes the ports 433a and 433b to be connected and also causes the ports 433c and 433d to connect, so that fluid then flows from the high pressure line 418 to the reel motor 95 to cause it to rotate. The fluid flows from the reel motor through the channel including the pipes 436 and 437 back to the low pressure line 438. The reel 90 then rotates and takes up the excess strap peeled therefrom by the wrapping ring 99 as previously described.

After the wrapping ring 99 has completed about one-half of a revolution, the cam 538 mounted thereon (Fig. 1) strikes and opens a switch 554 which is connected in the line 527, thereby deenergizing the solenoid 530 and causing the switches 531, 532 and 533 to open. The opening of the switch 531 insures that the solenoid 530 will not immediately reenergize when the switch 554 automatically closes due to its spring return after the cam 538 has passed. The opening of the switches 532 and 533 deenergizes the solenoid operated valve 455 by which the wrapping ring motor 104 is controlled. This causes the ports 455a and 455b to be blocked by a spring return contained therein and the pressure then builds up in the low pressure line 453, with the result that the rotating wrapping ring 99 rapidly slows up. When a predetermined pressure is reached in the pipes 451 and 453, the pressure relief valve 452 opens and allows fluid to return by the pipe 451 as well as slowly through the flow control valve 449. As the pressure then falls off, the valve 245 again closes and allows only a slow flow of fluid through the valve 449 as the wrapping ring 99 returns slowly to its normal starting position where its motion is arrested by the gentle engagement of the stop 406 with the lever 403 (Fig. 1), thus avoiding any shock to the apparatus which might be caused by the sudden stoppage of the ring.

The reel 90 continues to rotate after the wrapping ring is brought to rest and the transfer and braking device 105 is pulled around the frame 80, as previously described, while the reel takes up the excess strapping which has been peeled from it by the rotation of the wrapping ring 99. During this movement the transfer device 105 strikes and opens a switch 555 in the line 543, thereby deenergizing the relay solenoid 544 and opening the switches 545, 546 and 547. The opening of the switch 545 insures against a reenergization of the solenoid 544 when the switch 555 promptly closes due to its spring return after being disengaged by the transfer device 105. The opening of the switches 546 and 547 causes the deenergization of the solenoid operated valve 433 by which the reel motor 95 is controlled and the spring return in this valve then causes the connection of the ports 433a and 433c and of the ports 433b and 433d, so that the fluid then flows in an opposite direction through the motor 95 and tends to reverse its direction of rotation. This reversal causes a rapid deceleration of the motor 95 and when its speed has been reduced to zero, a one-way overrunning clutch 558 mounted on a member 559 (Fig. 2) engages the shaft of the motor and prevents reverse rotation. The fluid under pressure remains in the pipe 436, tending to reverse the reel motor, until it is relieved at the beginning of the next cycle by the transfer of the high pressure to the pipe 434 (Fig. 48), but until that time the rotation of the motor is prevented by the overrunning clutch 558.

An instant before the wrapping ring 99 reaches its rest position, the cam 538 mounted thereon strikes and closes the switch 539, previously referred to, thereby energizing the cam drive relay solenoid 500 and closing the switches 501 and 502 to energize the solenoid operated valve 440 by which the cam drive cylinder 203 is controlled. This causes a connection between the ports 440a and 440b and between the ports 440c and 440d so that fluid under pressure then flows through the pipes 426 and 441 to the cylinder 203 to extend the piston rod 202 and the rack 200 to cause the rotation of the cam shaft 175. From the cylinder 203 the fluid flows through the pipes 445 and 446 to the low pressure line 438.

As the cam shaft 175 rotates, the cams 180, 181, 182, 183 and 184 cause the upper gripping dog 166, the tensioning device 170, the lower gripping dog 171, the sealing device 165, and the strap ejectors 172 to be operated in the proper sequence as heretofore described in connection with Figs. 12 to 23, inclusive. All of these operations, except that of the strap tensioning device 170, are purely mechanical and are effected by mechanical connections extending from the cams 180, 181, 182 and 183. The tensioning device 170 is operated hydraulically under the control of the cam 184 which actuates the valve 465 (Figs. 1 and 48) by which the flow of compressed fluid to the cylinder 345 is controlled. The cam 184 has the formation shown in Fig. 29 which causes the connections of the valve to change as the cam shaft 175 rotates and causes this cam to occupy different positions. In the first position, the ports 465a and 465c are connected and the ports 465b and 465d are connected. Fluid then flows from the high pressure line 418 through the pipe 422, ports 465a and 465c, pipe 468, metering valve 469 and port 345b to the cylinder 345 to cause the retraction of the piston rod 344 and the tensioning of the strap 78. At this time, the fluid flows from the cylinder 345 through the port 345a, flow control valve 467, pipe 466, port 465b, port 465d and pipe 472 to the low pressure line 438.

In the second position of the cam 184, a connection is established between the ports 465a and 465b and between the ports 465c and 465d. Fluid then flows from the high pressure line 418 through pipe 422, port 465a, port 465b, pipe 466, flow control valve 467 and port 345a to the cylinder 345 to cause the piston 344 to extend and feed the strap 17 toward the sealing device 165, as shown in Figs. 19 to 22A, inclusive. On the low pressure side, fluid flows from the port 345b through the pipe 468, metering valve 469, port 465c, port 465d and pipe 472 to the return line 438. The metering valve 469 is adjusted so that it permits only a predetermined flow of fluid and then blocks further flow, thereby insuring that the feed of strap toward the rest plate 148 and the sealing device 165 is the same for each cycle while at the same time allowing an interval during which the upper gripping dog 166 moves to gripping position to grip the free end of the strap, as shown in Fig. 22.

After the cam 184 has rotated sufficiently to effect the foregoing operations, a pin 560 on the cam (Figs. 1 and 27) strikes and temporarily closes the switch 561 (Figs. 1 and 49), thereby again energizing the relay solenoid 511 and closing the holding switch 515 as well as the switches 516 and 517. The closing of the two last mentioned switches prepares the circuit between the points 519 and 520 for closing to energize the solenoid operated valve 458 for controlling the wrapping ring stop cylinder 400 when the switch 525 is again manually closed to start a new cycle. Also, the closing of the switch 517 completes the circuit of the solenoid 563 which is connected in parallel with the solenoid valve 458 between the points 564 and 565 (Fig. 49). The energization of the solenoid 563 opens the by-pass valve 471 so that a full flow of fluid then takes place around the metering valve 469 and the piston 344 of the strap tensioning cylinder continues its downward movement to return the tensioning device 170 to the starting position shown in Fig. 23. To start a new cycle, with a new box 77 on the table 76, it is only necessary for the operator to close the switch 525.

A switch 566 is connected in parallel with the switches 540 and 545 so that the relay solenoid 544 may be energized to cause a temporary rotation of the reel 90 whenever it is necessary to wind strap thereon or remove it therefrom. As previously explained, the energization of the solenoid 544 closes the switches 546 and 547, thereby energizing the solenoid operated valve 433 which controls the reel motor 95. This temporary rotation of the reel 90 may be stopped by opening the switch 566.

A switch 568 is connected between the points 498 and 514 (Fig. 49) and arranged to be automatically opened when the supply of seals 160 runs out in the magazine 210 (Fig. 35). When this switch is opened, the relay solenoid 500 for controlling the cam drive and the relay solenoid 511 for controlling the wrapping ring drive are not capable of being energized so that the machine is inoperative until the magazine is filled and the switch 568 closed.

A switch 570 is connected in the line 518 between the points 519 and 520 in series with the starting switch 525 and is so arranged that this branch line cannot be closed to energize the solenoid operated valve for controlling the reel stop cylinder 400 unless the sealing device is fully retracted to the position shown in Fig. 38. This prevents the jamming of the seal feed by the premature starting of a cycle.

The sequence and time duration of the various operations performed by the parts of the machine described may be further illustrated diagrammatically but not to scale by the charts of Figs. 50 and 51. In Fig. 50 there are illustrated by straight heavy lines the important mechanical movements of the machine in their timed relation to each other and their possible duration in what may be regarded for illustrative purposes as a typical operation of a strapping cycle beginning with the manual actuation of the starting switch 525 and continuing through the automatic sequential operation of the switches 526, 540, 554, 539, 555 and 561 in the order shown. The other switches and solenoids which are actuated in response to the principal switches shown in Fig. 50 are indicated in the chart of Fig. 51. The switches 487, 485 and 510 shown in the first column of Fig. 51 are closed only to prepare the electrical circuits and to fill the hydraulic pipes with fluid under pressure in readiness for a strapping cycle. The manual switch 525 is then operated to start an individual strapping cycle and the switches 487, 485 and 510 are not actuated again while the machine is in operation. When the machine is shut down, the switches 485 and 495 are opened. The opening of the switch 495 shuts off the pump motor 410 by deenergizing the solenoid 488 to reopen the switches 489, 478, 479 and 480 and the fluid pressure in the system is relieved as the pump 411 stops. In the diagrammatic showing of a cycle represented in Fig. 50, it is to be understood that many of the movements are variable as to the time and duration of their occurrence and may be varied in these respects by adjustment of certain of the cams and switches and by regulating the flow of hydraulic fluid. For example, the reel 90 may be made to stop at a different time in relation to the stopping of the wrapping ring 99 by relocating the switch 555. This adjustment may be required to suit the size of the box being strapped.

The embodiment of the invention which has been described above is one in which the interlocking joint 159 between the strap ends is formed with the use of a metal seal 160 which is caused to embrace the strap ends and is then deformed with the strap to form a joint. The joint may be otherwise formed and in Figs. 52 to 58, inclusive, there is illustrated a modification of the joint forming mechanism by which the overlapping ends of the strap 578 (Fig. 52) are united by spot welds 579.

This change in the box strapping machine involves the substitution for the sealing device 165, previously described, of a welding device 580, and also some other changes of related parts including the provision of a different shearing device for cutting off the strap from the supply. The welding device 580 comprises two parallel welding arms 582 which are arranged side by side and are insulated from a supporting arm 584 to which they are secured by screws 583. The welding arms have enlarged heads 582a provided with welding points 582b and flanges 582c which extend rearwardly beneath the forward end of the arm 584 so that the screws 583 may be directed upwardly through these flanges (as viewed in Fig. 53) and through the arm 584 into the body portion of the supporting arm. The arm 584 is pivotally connected at 585 to a supporting link 586. The other end of the link 586 is pivoted at 587 to an extension 588 of the cam housing 176, a shorting bar 590 is secured to the plate 588 by a screw 591, and the strap ends 578 are adapted to rest on this bar during the welding operation.

The supporting arm 584 is pivoted at 593 to a crank arm 594 keyed on a shaft 596 which is journaled in bearings mounted in the upper and lower walls of the cam housing, similar to the mounting of the shaft 247 in Fig. 28. This mounting of the supporting arm 584 permits the welding head to pivot between the operating position shown in Fig. 53 and the retracted position shown in Fig. 54. Its retracted position is determined by an adjustable stop screw 596 which engages a shoulder 594a on the crank arm and threadedly engages the wall of the cam housing where it is held in adjusted position by a lock nut 597.

A substantially U-shaped flexible cable 600 of laminated construction is mounted on each of the welding arms 582, being secured thereto at one end by a pair of studs 601. The other end of each cable 600 enters a recess 602a formed in the end of a metal bar 602 where it is clamped in position by two studs 603. The bars 602 are spaced apart and are secured to, but insulated from, the cam housing 176. The ends 602b of the bars 602 are connected to the leads 604 of the secondary winding of a welding transformer 605 shown diagrammatically in the lower part of Fig. 49 as a modification of or addition to the electric circuit there illustrated. The primary winding of the transformer 605 is connected to the branch line conductors 482 and 484 in the manner hereinafter described. When the circuit of the primary winding is closed current passes from the secondary winding through the welding circuit, assuming that the welding head is then in the operative position shown n Fig. 53 with the overlapping strap ends 578 resting on the shorting bar 590, and as the current passes through the strap ends and the shorting bar the spot welds 579 are formed to unit the strap ends at the places where the welding tips 582b are located.

The mechanism for moving the welding head between the two positions shown in Figs. 53 and 54 is shown particularly in Fig. 56 where the shaft 595 is shown as having an arm 606 secured thereon and extending in a general direction transversely to the crank arm 594. A heavy coil spring 608 is secured to the extremity 606a of this arm and to a projection 609 extending from the cam housing so that it acts normally to move the welding head to the retracted position shown in Fig. 54. A bell-shaped lever 610 is rotatably mounted on the shaft 595 and a roller 611 is mounted at the angle of this lever to bear upon the peripheral surface of a cam 612 fixed on the cam shaft 175. A coil spring 616 is mounted between the lever 610 and the arm 606 on a bolt 617 engaged by a nut 618 which may be adjusted to vary the compression of the spring and the pressure with which the welding points engage when the welding head is moved to the operative position shown in Fig. 53 by the rotation of the cam. The cam 612 rotates in the direction of the arrow 619 and its cam engaging surface of larger radius is of comparatively short length since the period during which the welding head must be in operative position is short as compared with the time the sealing device 165 must be in that position.

An auxiliary arcuate cam 620 is secured to the side face of the cam 612 and engages a roller 621 on the operating lever 622 of an electric switch 623 which is adapted to be connected in the electric circuit as diagrammatically illustrated in Fig. 49. When the switch 623 is closed at the proper time by the cam 620 after the welding head has been moved to its operative position, contacts in a contactor 624 are also closed and the current flows through a conventional timer relay 625 which may be adjusted to vary the time during which the welding current flows in the secondary circuit. With the use of this welding device the operation of forming a joint between the overlapping strap ends is simplified as compared with the operation of forming a joint by the use of seals and all of those parts of the system which are directed specifically to the use of seals may be removed if the welding device is employed.

When using the welding apparatus it is necessary to provide a separate strap shearing device since there is no part associated directly with the welding apparatus which may cooperate with the upper gripping dog to cut off the strap as is the case when a sealing device is used. Such a strap shearing device is shown in Figs. 57, 57A, 58 and 59 and comprises two adjacent bars 630 and 631 which have relative sliding endwise movement in a guide channel formed in a spacer plate 632 which is a part of the cam housing 175. The forward portion of the bar 630 has pivoted thereto at 633 a link 634 which has its opposite end pivoted at 635 to a bell crank shearing lever 636 having an extremity 636a formed as a shearing blade adapted to extend on the outer side of the supply portion of the strap which extends from the tensioning device 170. The lever 636 is pivoted at 637 on the end portion of the other bar 631, and has a tail portion 636b adapted to engage a lug 638 on the spacer plate 632 to limit its movement in a clockwise direction as viewed in Fig. 57. The bar 631 has an extension 631a adapted to extend between the two strap portions at the place of overlap and this extension acts as a stationary die to cooperate with the movable blade 636a to sever the strap when the parts are in operative position as shown in Fig. 58.

The bar 630 has an extension 630a at its inner end to which there is connected a coil spring 640 attached to a block 641 forming a part of the cam housing and this spring normally retracts the bar 630 from its operative position. The bar 630 is moved in the opposite direction by a lever 643 having a slot 643a in its end which is engaged by a pin 644 fixed in the side of the bar. The other end of the lever 643 is adapted to be actuated by a roller 645 mounted on the side of the cam 181 which is mounted on the cam shaft 175. When this roller strikes the lever with the cam 184 rotating in the direction of the arrow 646, the lever moves the bar 630 from the position shown in Fig. 57 to the position shown in Fig. 58, where the shearing blades are on opposite sides of the strap to be cut. As this movement toward the shearing position takes place, the shearing lever 636 keeps the position shown in Fig. 57 with respect to the bar 631 because the lever is then restrained by the top wall 647 of the guideway on the spacer plate. As the parts reach the position shown in Fig. 8, the end 636b of the shearing lever is just past the corner 648 where the top wall of the guideway intersects the recessed guideway 649 in the spacer plate. At this point the bar 631 is prevented from further movement with the bar 630 because its shoulder engages the end surface 650 of the guideway (see Fig. 57A). As the shearing device continues to extend the bar 630 slides with respect to the now stationary bar 631 with the result that the link 634 actuates the shearing lever and causes the blade 636a to shear the strap as shown in Fig. 59. The motion of the bar 630 to the shearing position is limited by the engagement of the shoulder 630c on this bar with the rear end 631c of the other bar. As the cam continues to rotate the parts restore to their initial positions under the influence of the spring 640.

The shearing device and the welding device have the relative positions with respect to the other parts of the mechanism which are shown in Fig. 55 and may be substituted for the sealing device and its associated parts without altering the sequential operation of the system as heretofore described.

Although one form of the improved box strapping machine and a modification of one portion thereof have been shown and described by way of illustration, it will be understood that the invention may have various other embodiments without departing from the scope of the appended claims.

We claim:

1. A box strapping machine comprising a reel for supporting a coil of strap, means for supporting a box, and means movable around said box in a plane parallel to the plane of said coil and in a direction opposite to the winding of said coil for removing strap from said coil and wrapping it around said box.

2. A box strapping machine comprising a rotatable reel for supporting a coil of strap, means for supporting a box, means movable around said box in a direction opposite to the winding of said coil for peeling strap from said coil and wrapping it around said box, means for actuating said last named means, and means for rotating said reel in said direction.

3. A box strapping machine comprising a rotatable reel for supporting a coil of strap, means for supporting a box, means movable around said box in a direction opposite to the winding of said coil for peeling strap from said coil and wrapping it around said box, means for transferring said strap from said reel to said movable means, means for actuating said movable means, and means for rotating said reel in said direction.

4. A box strapping machine comprising a rotatable reel for supporting a coil of strap, means for supporting a box, means movable around said box in a direction opposite to the winding of said coil for peeling strap from said coil and wrapping it around said box, means for actuating said last named means, means for rotating said reel in said direction, and braking means mounted independently of said movable means and movable around said box for controlling the transfer of strap from said reel to said movable means.

5. A box strapping machine comprising a rotatable reel for supporting a coil of strap, means for supporting a box, a rotatable wrapping ring adapted to withdraw strap from said reel in a direction opposite to the winding of said coil and wrapping it around said box, means for rotating said ring, and means for rotating said coil in said direction.

6. A box strapping machine comprising a rotatable reel for supporting a coil of strap, means for supporting a box, a rotatable wrapping ring, a series of guide wheels mounted on said ring at spaced intervals throughout its periphery for guiding strap withdrawn from said reel, means for rotating said ring in a direction opposite to the direction of the winding of the strap on said reel to withdraw strap from said reel and wrap it around said box, and means for rotating said reel.

7. A box strapping machine comprising a rotatable reel for supporting a coil of strap, means for supporting a box, a rotatable wrapping ring, a series of guide wheels mounted on said ring at spaced intervals throughout its periphery for guiding strap withdrawn from said reel, means for rotating said ring to withdraw strap from said reel and wrap it around said box, a transfer device about which said strap is looped in passing from said reel to said ring, and means for rotating said reel in the direction in which said ring is rotated.

8. A box strapping machine comprising a rotatable reel for supporting a coil of strap, means for supporting a box, a rotatable wrapping ring, a series of guide wheels mounted on said ring for guiding strap withdrawn from said reel, means for rotating said ring to withdraw strap from said reel and wrap it around said box, and a transfer device mounted independently of said ring to move around an annular path and having said strap looped around it in passing from said reel to said ring, said transfer device having means for exerting a braking action and maintaining the strap taut as it is wrapped.

9. A box strapping machine comprising a frame, a reel rotatably mounted in said frame for supporting a coil of strap, means for supporting a box, a wrapping ring rotatably mounted in said frame to withdraw strap from said reel and wrap it around said box, an annular track mounted on said frame, and a transfer device about which strap moves from said reel to said ring, said transfer device being mounted to travel on said track independently of said ring and to move during the wrapping of the box.

10. A box strapping machine comprising a frame, a reel rotatably mounted in said frame for supporting a coil of strap, means for supporting a box, a wrapping ring rotatably mounted in said frame to withdraw strap from said reel and wrap it around said box, an annular track mounted on said frame, and a transfer device about which strap moves from said reel to said ring, said transfer device being mounted to travel on said track and to move during the wrapping of the box, said transfer device having parts coacting with said track to resist the travel of said device and thereby maintain the strap taut as it is wrapped around the box.

11. A box strapping machine comprising a frame, a reel rotatably mounted in said frame for supporting a coil of strap, means for supporting a box, a wrapping ring rotatably mounted in said frame to withdraw strap from said reel and wrap it around said box, an annular track mounted on said frame, and a transfer device engaged by said strap and mounted to travel on said track in response to the pull of the strap being wound on said box and having means for reversing the direction of the strap as it passes from said reel to said ring.

12. A box strapping machine comprising a frame, a reel rotatably mounted in said frame for supporting a coil of strap, means for supporting a box, a wrapping ring rotatably mounted in said frame to withdraw strap from said reel and wrap it around said box, an annular track mounted on said frame, a transfer device engaged by said strap and mounted to travel on said track in response to the pull of the strap being wound on said box and having means for reversing the direction of the strap as it passes from said reel to said ring, means for rotating said ring, and independent means for rotating said reel in the direction in which said ring is rotated.

13. A box strapping machine comprising a frame, a reel rotatably mounted in said frame for supporting a coil of strap, means for supporting a box, a wrapping ring rotatably mounted in said frame to withdraw strap from said reel and wrap it around said box, an annular track mounted on said frame, and a transfer device engaged by said strap and mounted to travel on said track in response to the pull of the strap being wound on said box and having means for reversing the direction of the strap as it passes from said reel to said ring, said transfer having braking means coacting with said track to retard the movement of said device and thereby cause the strap to be wound in a taut condition on said box.

14. A box strapping machine comprising a frame, a reel rotatably mounted in said frame for supporting a coil of strap, means for supporting a box, a wrapping ring rotatably mounted in said frame to withdraw strap from said reel and wrap it around said box, an annular track mounted on said frame, a transfer device engaged by said strap and mounted to travel on said track in response to the pull of the strap being wound on said box and having means for reversing the direction of the strap as it passes from said reel to said ring, means for rotating said ring, means for rotating said reel in the direction in which said ring is rotated, means for stopping said ring, and means for causing the rotation of said reel to continue after said ring has stopped rotating.

15. A box strapping machine comprising a frame, a reel rotatably mounted in said frame for supporting a coil of strap, means for supporting a box, a wrapping ring rotatably mounted in said frame to withdraw strap from said reel and wrap it around said box, an annular track mounted on said frame, a transfer device engaged by said strap and mounted to travel on said track in response to the pull of the strap being wound on said box and having means for reversing the direction of the strap as it passes from said reel to said ring, means for rotating said ring, and means for automatically stopping said ring after the box has been wrapped.

16. A box strapping machine comprising means for supporting a coil of strap, means for supporting a box, means for holding the free end of said strap adjacent said box, means for withdrawing strap from said coil and wrapping it around said box until the supply portion overlaps said end, tensioning means for thereafter engaging said supply portion and drawing said strap taut around said box, means for gripping said supply portion adjacent said holding means, means for cutting off the supply portion and joining the overlapping strap portions, means for releasing said strap from said holding means and said gripping means, and means for then reversing said tensioning means while it is still gripping said supply portion to feed the supply end of the strap to a position to be engaged by said holding means.

17. A box strapping machine comprising means for supporting a coil of strap, means for supporting a box, means for holding the free end of said strap adjacent said box, means for withdrawing strap from said coil and wrapping it around said box until the supply portion overlaps said end, tensioning means for thereafter engaging said supply portion and drawing said strap taut around said box, means for gripping said supply portion adjacent said holding means, means for cutting off the supply portion and joining the overlapping strap portions, means for releasing said strap from said holding means and said gripping means, means for then reversing said tensioning means while it is still gripping said supply portion to feed the supply end of the strap to a position to be engaged by said holding means, and means for causing all of said operations except said coil supporting means and said box supporting means to be operated automatically in predetermined timed relation.

18. A box strapping machine comprising a support for a coil of strap, a support for a box, means for holding the free end of said strap adjacent a box on its support, a wrapping device for withdrawing strap from said coil and wrapping it around said box until the supply portion overlaps said end, tensioning means independent of said holding means for thereafter drawing said strap taut around said box, means for gripping said supply portion, means for cutting off the supply portion and joining the overlapping strap portions, a fluid pressure operated device for actuating said tensioning means, and means including a rotary cam shaft for controlling the operation of said fluid pressure operated device and said means other than said tensioning means.

19. A box strapping machine comprising a support for a coil of strap, a support for a box, means for holding the free end of said strap adjacent a box on its support, a wrapping device for withdrawing strap from said coil and wrapping it around said box until the supply portion overlaps said end, tensioning means independent of said holding means for thereafter drawing said strap taut around said box, means for gripping said supply portion, means for cutting off the supply portion and joining the overlapping strap portions, a fluid pressure operated device for actuating said tensioning means, means including a rotary cam shaft for controlling the operation of said fluid pressure operated device and said means other than said tensioning means, and fluid pressure operated means for rotating said cam shaft.

20. A box strapping machine comprising an annular frame having a central opening, means for supporting a box in said opening, a reel mounted for rotation on said frame and adapted to support a coil of strap, a wrapping ring rotatably mounted on said frame for movement about said box, means for holding the free end of the strap adjacent said box, guiding means on said ring for supporting strap drawn from said coil and directing it around said box, means for rotating said reel, means for rotating said ring in the direction in which said reel rotates, and means for reversing the direction of said strap as it passes from said coil to said ring.

21. A box strapping machine comprising an annular frame having a central opening, means for supporting a box in said opening, a reel mounted for rotation on said frame and adapted to support a coil of strap, a wrapping ring rotatably mounted on said frame for movement about said box, means for holding the free end of the strap adjacent said box, guiding means on said ring for supporting strap drawn from said coil and directing it around said box, means for rotating said reel, means for rotating said ring in the direction in which said reel rotates, an annular track carried by said frame, and a transfer device mounted on said track and adapted to be pulled around the box by said ring as the box is wrapped, said transfer having a wheel about which said strap passes and is reversed in direction as it moves from said coil to said ring and having braking means coacting with said track for retarding its movement.

22. A box strapping machine comprising an annular frame having a central opening, means for supporting a box in said opening, a reel mounted for rotation on said frame and adapted to support a coil of strap, a wrapping ring rotatably mounted on said frame for movement about said box, means for holding the free end of the strap adjacent said box, guiding means on said ring for supporting strap drawn from said coil and directing it around said box, means for rotating said reel, means for rotating said ring in the direction in which said reel rotates, an annular track carried by said frame, a transfer device mounted on said track and adapted to be pulled around the box by said ring as the box is wrapped, said transfer having a wheel about which said strap passes and is reversed in direction as it moves from said coil to said ring and having braking means coacting with said track for retarding its movement, and means for stopping said ring after one revolution, said reel being adapted to rotate and pull said transfer device on said track after said ring has stopped.

23. A box strapping machine comprising an annular frame having a central opening, means for supporting a box in said opening, a reel mounted for rotation on said frame and adapted to support a coil of strap, a wrapping ring rotatably mounted on said frame for movement about said box, means for holding the free end of the strap adjacent said box, guiding means on said ring for supporting strap drawn from said coil and directing it around said box, means for rotating said reel, means for rotating said ring in the direction in which said reel rotates, an annular track carried by said frame, and a transfer device mounted on said track and adapted to be pulled around the box by said ring as the box is wrapped, said transfer having a wheel about which said strap passes and is reversed in direction as it moves from said coil to said ring and having braking means coacting with said track for retarding its movement, said braking device having means for gripping said track to arrest its movement when the pull on the strap is released.

24. A box strapping machine comprising a frame, a reel rotatably mounted in said frame for supporting a coil of strap, means for supporting a box, a wrapping ring rotatably mounted in said frame to withdraw strap from said reel and wrap it around said box, an annular track mounted on said frame, and a transfer device mounted to travel around said track and having a pulley about which said strap is looped and reversed in direction as it passes from said reel to said ring, said transfer means having braking means automatically engaging said track and arranged to be released in response to a pull on said strap around said pulley.

25. A box strapping machine comprising means for supplying strap, means for withdrawing strap from said supply and wrapping around said box, an annular track extending around said box, a transfer frame mounted to travel around said track, a pulley frame movably mounted on said frame, a pulley mounted on said pulley frame and having said strap looped around it in passing from said supply to said wrapping means, and resilient means for resisting movement of said pulley frame in response to the pull on the strap passing around said pulley.

26. A box strapping machine comprising means for supplying strap, means for withdrawing strap from said supply and wrapping around said box, an annular track extending around said box, a transfer frame mounted to travel around said track, a pulley frame movably mounted on said frame, a pulley mounted on said pulley frame and having said strap looped around it in passing from said supply to said wrapping means, resilient means for resisting movement of said pulley frame in response to the pull on the strap passing around said pulley, and braking means carried by said transfer frame to coact with said track and having connections whereby it is actuated in response to the relative movement of said frames.

27. A box strapping machine comprising means for supporting a supply of strap, means for supporting a box, means for withdrawing strap from said supply and wrapping it around said box, a gripping device for holding the free end of the strap adjacent the box, tensioning means for drawing the strap taut around said box, means for cutting off the supply portion of the strap and forming a joint between the ends of the strap wrapped around said box, and means for then actuating said tensioning means to move the supply end of said strap to a position to be engaged by said gripping device.

28. A box strapping machine comprising means for supporting a supply of strap, means for supporting a box, means for withdrawing strap from said supply and wrapping it around said box, a gripping device for holding the free end of the strap adjacent the box, tensioning means for drawing the strap taut around said box, means for cutting off the supply portion of the strap and forming a joint between the ends of the strap wrapped around said box, means for then actuating said tensioning means to move the supply end of said strap to a position to be engaged by said gripping device, and means including rotating cams for operating said gripping device and said tensioning device.

29. A box strapping machine comprising means for supporting a supply of strap, means for supporting a box, means for holding the free end of the strap adjacent said box, means for withdrawing strap from said supply and wrapping it around said box while said end is held, a strap tensioning device having means for gripping the supply portion of said strap, means for moving said gripping means into the path of said strap and then causing it to grip said strap, means for then automatically actuating said tensioning means for drawing the strap taut around the box, means for cutting off the supply portion of the strap and forming a joint between the ends of the strap wrapped around the box, and means for then reversing the movement of said gripping means to move the supply end of the strap to a position to be engaged by said holding means.

30. A box strapping machine comprising means for supporting a supply of strap, means for supporting a box, means for holding the free end of the strap adjacent said box, means for withdrawing strap from said supply and wrapping it around said box while said end is held, a strap tensioning device having means for gripping the supply portion of said strap, means for moving said gripping means into the path of said strap and then causing it to grip said strap, means for then automatically actuating said tensioning means for drawing the strap taut around the box, means for cutting off the supply portion of the strap and forming a joint between the ends of the strap wrapped around the box, means for releasing said holding means from the strap wrapped around the box, means for then reversing the movement of said gripping means to move the supply end of the strap to a position to be engaged by said holding means, and means for actuating said holding means to hold said strap end so positioned.

31. A box strapping machine comprising means for supporting a supply of strap, means for supporting a box, means for holding the free end of the strap adjacent said box, means for withdrawing strap from said supply and wrapping it around said box while said end is held, a guide plate, an operating plate, strap gripping means carried by said operating plate, means for moving said operating plate on said guide plate to cause said gripping means to embrace the supply portion of said strap, means for then automatically causing said gripping means to grip said strap, and means for causing continued movement of said operating plate on said guide plate to draw the strap taut around the box.

32. A box strapping machine comprising means for supporting a supply of strap, means for supporting a box, means for holding the free end of the strap adjacent said box, means for withdrawing strap from said supply and wrapping it around said box while said end is held, a strap tensioning device having means for gripping said strap, means for moving said gripping means into the path of said strap and then causing it to grip said strap, a guide plate, an operating plate, strap gripping means carried by said operating plate, means for moving said operating plate on said guide plate to cause said gripping means to embrace the supply portion of said strap, means for then automatically causing said gripping means to grip said strap, means for causing continued movement of said operating plate on said guide plate to draw the strap taut around the box, means for cutting off the supply portion of the strap and forming a joint between the ends of the strap wrapped around the box, means for operating said holding means to release said strap, and means for then automatically reversing the direction of movement of said operating plate to move the supply end of the strap to a position to be held by said holding means.

33. A box strapping machine comprising means for supporting a supply of strap, means for supporting a box, means for holding the free end of the strap adjacent said box, means for withdrawing strap from said supply and wrapping it around said box while said end is held, a guide plate, and operating plate, strap gripping means carried by said operating plate, means for moving said operating plate on said guide plate to cause said gripping means to embrace the supply portion of said strap, means for then automatically causing said gripping means to grip said strap, means for causing continued movement of said operating plate on said guide plate to draw the strap taut around the box, means for cutting off the supply portion of the strap and forming a joint between the ends of the strap wrapped around the box, means for operating said holding means to release said strap, means for then automatically reversing the direction of movement of said operating plate to move the supply end of the strap to a position to be held by said holding means, means for then causing said holding means to hold said supply end, and means for automatically causing said supply end to be released by said gripping means of said tensioning device and retracting said gripping means from the path of said strap.

34. A box strapping machine comprising a rotatable reel for supporting a coil of strap, means for supporting a box, a rotatable wrapping ring for withdrawing strap from said reel and wrapping it around said box, a fluid pressure motor for rotating said reel, a second fluid pressure motor for rotating said wrapping ring, means including an electric circuit for controlling the operation of said motors, and means actuated by the rotation of said wrapping ring for controlling the operation of said circuit.

References Cited in the file of this patent

UNITED STATES PATENTS

| | | |
|---|---|---|
| 1,951,892 | Williams | Mar. 20, 1934 |
| 1,983,473 | Leaver | Dec. 4, 1934 |
| 2,124,770 | Evans | July 26, 1938 |
| 2,191,082 | Parker | Feb. 20, 1940 |
| 2,194,108 | Wright | Mar. 19, 1940 |
| 2,288,088 | Harvey | June 30, 1942 |
| 2,285,120 | Marcher | June 2, 1942 |
| 2,307,219 | Harvey | Jan. 5, 1943 |
| 2,367,168 | Cheesman | Jan. 9, 1945 |
| 2,608,150 | Cranston | Aug. 26, 1952 |
| 2,614,487 | Cheesman | Oct. 21, 1952 |
| 2,630,751 | Cranston et al. | Mar. 10, 1953 |
| 2,655,097 | Fons et al. | Oct. 13, 1953 |